US012581340B2

(12) United States Patent
Zhohov et al.

(10) Patent No.: US 12,581,340 B2
(45) Date of Patent: Mar. 17, 2026

(54) METHOD OF REDUCING TRANSMISSION OF DATA IN A COMMUNICATIONS NETWORK BY USING MACHINE LEARNING

(71) Applicant: Telefonaktiebolaget LM Ericsson (publ), Stockholm (SE)

(72) Inventors: Roman Zhohov, Linköping (SE); Ursula Challita, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 648 days.

(21) Appl. No.: 17/924,769

(22) PCT Filed: May 15, 2020

(86) PCT No.: PCT/SE2020/050502
§ 371 (c)(1),
(2) Date: Nov. 11, 2022

(87) PCT Pub. No.: WO2021/230785
PCT Pub. Date: Nov. 18, 2021

(65) Prior Publication Data
US 2023/0180039 A1 Jun. 8, 2023

(51) Int. Cl.
*H04W 24/10* (2009.01)
*H04L 41/16* (2022.01)
*H04W 28/06* (2009.01)

(52) U.S. Cl.
CPC ............. *H04W 24/10* (2013.01); *H04L 41/16* (2013.01); *H04W 28/06* (2013.01)

(58) Field of Classification Search
CPC ........ H04W 24/10; H04W 28/06; H04L 41/16
See application file for complete search history.

(56) References Cited

U.S. PATENT DOCUMENTS

2015/0189644 A1 7/2015 Lorca Hernando
2018/0314985 A1 11/2018 O'Shea
(Continued)

OTHER PUBLICATIONS

Author Unknown, "Technical Specification Group Radio Access Network; Evolved Universal Terrestrial Radio Access (E-UTRA); Physical layer; Measurements (Release 16)," Technical Specification 36.214, Version 16.0.0, Dec. 2019, 3GPP Organizational Partners, 26 pages.
(Continued)

*Primary Examiner* — Gbemileke J Onamuti
(74) *Attorney, Agent, or Firm* — Sage Patent Group

(57) ABSTRACT

The present disclosure relates to a computer implemented method, performed by a wireless device, for reducing data transmission in a communications network by compression of measurements of network characteristics of the communications network, comprising the method steps of: obtaining a trained encoder, of a trained autoencoder, performing a measurements of network characteristics of the communications network, applying the trained encoder to compress the result of the measurements of network characteristics, and transmitting the compressed representation of measurements of network characteristics towards a network entity, whereby the network entity may perform a method comprising the method steps of: obtaining a trained decoder, of the trained autoencoder, receiving a compressed representation of a measurements of network characteristics, and applying the trained decoder to reconstruct the compressed representation of the measurements of network characteristics.

18 Claims, 19 Drawing Sheets

(56) References Cited

U.S. PATENT DOCUMENTS

| 2018/0367192 | A1 | 12/2018 | O'Shea et al. |
| 2020/0018815 | A1 | 1/2020 | O'Shea et al. |
| 2021/0273706 | A1* | 9/2021 | Zeng .................. H04B 7/0486 |

OTHER PUBLICATIONS

Author Unknown, "Technical Specification Group Radio Access Network; Evolved Universal Terrestrial Radio Access (E-UTRA); Radio Resource Control (RRC); Protocol specification (Release 16)," Technical Specification 36.331, Version 16.0.0, Mar. 2020, 3GPP Organizational Partners, 1048 pages.

Baldi, Pierre, "Autoencoders, Unsupervised Learning, and Deep Architectures," Workshop on Unsupervised and Transfer Learning, vol. 27, 2012, pp. 37-50.

Bengio, Yoshua, " Learning Deep Architecture for Al," Technical Report 1312, 2009, 56 pages.

Wen, et al., "Deep Learning for Massive Mimo Csi Feedback," IEEE Wireless Communications Letters, vol. 7, Issue 5, Oct. 2018, pp. 748-751.

International Search Report and Written Opinion for International Patent Application No. PCT/SE2020/050502, mailed Feb. 17, 2021, 17 pages.

* cited by examiner

S210   Obtaining a trained encoder

S220   Performing a measurement of network characteristics of the communications network S230   Applying the trained encoder to compress the result of the measurement of network characteristics S240   Transmitting the compressed result of measurement of network characteristics S810   Obtaining a trained decoder S820   Receiving a compressed output of a measurement of network characteristics S830   Applying the trained decoder to reconstruct the compressed output of the measurement of network characteristics S840   Utilizing the reconstructed result of the measurement of network characteristics

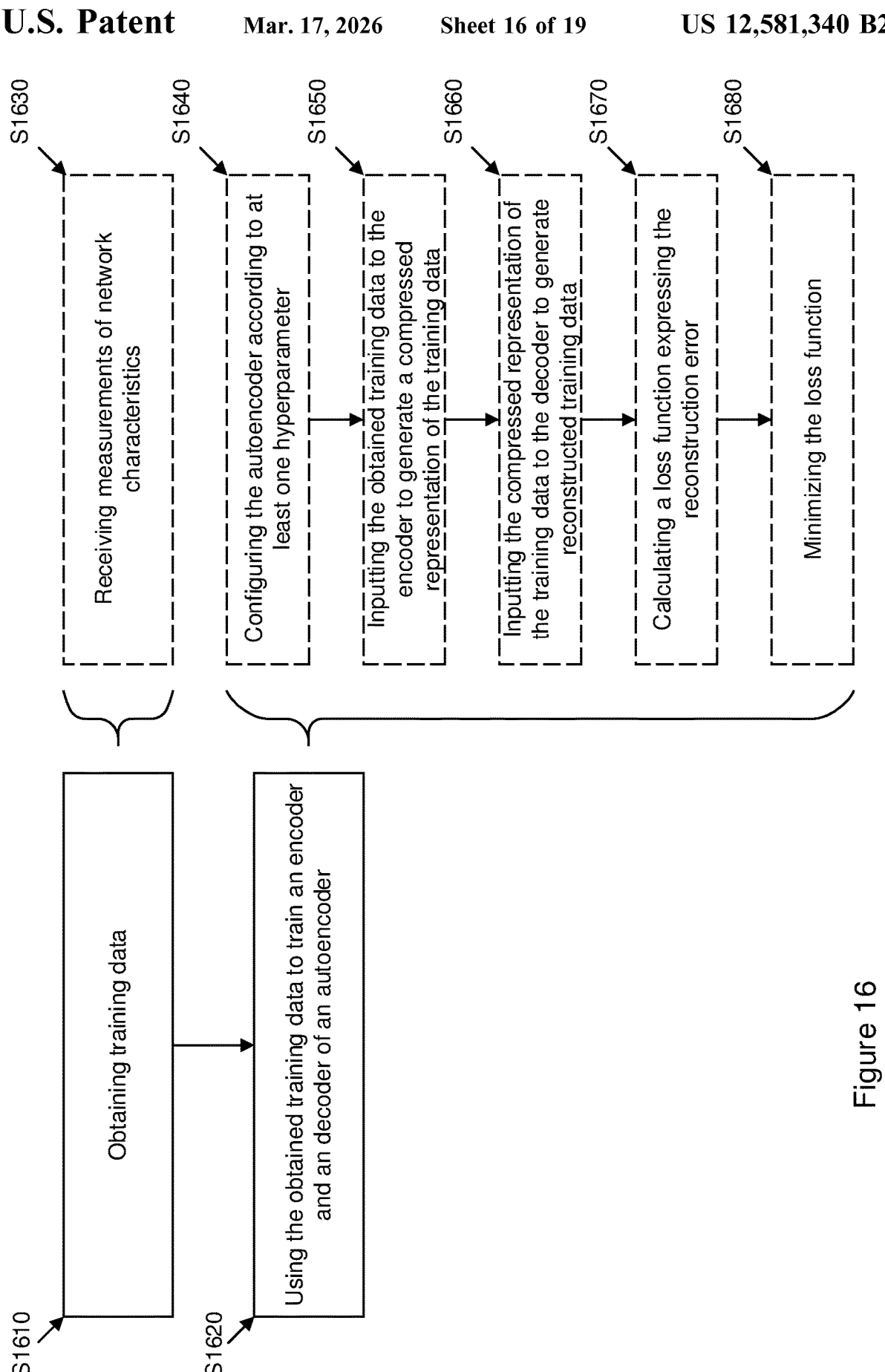

S1610 Obtaining training data

S1620 Using the obtained training data to train an encoder and an decoder of an autoencoder S1630 Receiving measurements of network characteristics S1640 Configuring the autoencoder according to at least one hyperparameter S1650 Inputting the obtained training data to the encoder to generate a compressed representation of the training data S1660 Inputting the compressed representation of the training data to the decoder to generate reconstructed training data S1670 Calculating a loss function expressing the reconstruction error S1680 Minimizing the loss function

Figure 16

Network entity / Radio Access Netwotk Node

1700

Processing Circuitry 1710

1711

Memory 1720

1750

Communication Interface 1730

1740

METHOD OF REDUCING TRANSMISSION OF DATA IN A COMMUNICATIONS NETWORK BY USING MACHINE LEARNING

This application is a 35 U.S.C. § 371 national phase filing of International Application No. PCT/SE2020/050502, filed May 15, 2020, the disclosure of which is incorporated herein by reference in its entirety.

TECHNICAL FIELD

The present disclosure relates to methods for reducing data transmission in communications network, and to devices configured for performing such methods. Particularly, the present disclosure relates to methods and devices for reducing transmission of data related to measurements performed by a wireless device.

BACKGROUND

The use of cellular network technology and wireless/ mobile communication systems, herein generally referred to communications networks, continues to grow rapidly, and new wireless technologies and standards are constantly emerging. Just to mention a few of the currently existing communication systems; the Universal Mobile Telecommunications System, UMTS, which may be considered to be the third generation, 3G, mobile communication system, evolved from the Global System for Mobile Communications, GSM, and was intended to provide improved mobile communication services based on Wideband Code Division Multiple Access, WCDMA, access technology. A key part of GSM is the GSM EDGE Radio Access Network, GERAN. The standards for example for GERAN was maintained by the 3rd Generation Partnership Project, 3GPP. The work within 3GPP is performed by different working groups, and what is decided by the working groups are published as for example 3GPP Technical Specifications, TS, and Technical Reports, TR, in which it is defined how wireless networks should be configured, maintained and developed. The UMTS Terrestrial Radio Access Network, UTRAN is essentially a Radio Access Network, RAN, using Wideband Code Division Multiple Access, WCDMA. A wireless communication system generally covers a geographical area which generally is divided into particular geographical areas referred to as network cells, cell areas or simply cells. Each network cell area is served by a base station. The Base Stations, BSs, of the third generation of mobile communication systems are generally referred to as NodeBs or NBs. The fourth generation, 4G, of mobile communication systems is generally referred to as Long Term Evolution, LTE. The 3rd Generation Partnership Project for Long Term Evolution, 3GPP LTE, is, and has been, responsible to evolve the UTRAN into what often is referred to as Evolved UTRAN, E-UTRAN. In LTE the E-UTRAN connects the wireless devices, or User Equipment, UEs, to a core network, generally referred to as Evolved Packet Core, EPC. Together with the E-UTRAN the EPC forms the Evolved Packet System, EPS. The base stations of the fourth generation of mobile communication systems are generally referred to as evolved NodeBs, eNodeBs or eNBs. The 3GPP LTE radio access standards have been written in order to support high bitrates and low latency both for uplink and downlink traffic. Currently 3GPP is working on standardization relating to the fifth generation, 5G, of mobile communication systems, which also is referred to as New Radio, NR, and also future mobile communication systems generally referred to as 6G and even 7G, indicating that they are the sixth and seventh generation of wireless communication systems. In the 5G work in 3GPP a split between Mobility Management, MM, and Session Management, SM, has been defined compared to in EPC where MME, Mobility Management Entity, supports both MM, Mobility Management, and some SM, Session Management, functionality. As for previous generations of wireless communication systems, NR 5G, and later generations of telecommunications networks, is also defined and developed by 3GPP groups. The base stations of the fifth generation of mobile communication systems are generally referred to as next generation NodeBs, gNodeBs or gNBs. Wireless communication systems can also be referred to as for example communications networks, mobile communication systems and wireless networks. Base stations can also be referred to as for example network entity, network node or RAN node.

For each generation of cellular network technology, the amount of control data, referring to for example measurements of various parameters and/or network characteristics, transmitted from wireless devices like smart phones, to network entities, often referred to as base stations or network nodes, is increasing. Such data or information is required in order for the communications network to orchestrate various network configurations and operations like for example link adaption, handover, beam forming or scheduling parameter tuning, just to mention a few. When such measurements should be performed, or what may trigger such measurements to be performed, is generally controlled by standard protocols. This in turn leads to a huge amount of information or control data that needs to be transmitted in the communications network in order to enable efficient and optimized wireless communication over the communications network. Communicating wirelessly may involve transmitting and/or receiving wireless signals using electromagnetic waves, radio waves, infrared waves, and/or other types of signals suitable for conveying information through air. When transmitted, these periodical measurements and measurement reports distribute accurate fine-grained data, however, it creates overhead which decrease the efficiency of the communications network.

To give an example of a procedure generating measurement reports, defined in 3GPP TS 36.214, V16.0.0 (2020-01), 3rd Generation Partnership Project; Technical Specification Group Radio Access Network; Evolved Universal Terrestrial Radio Access (E-UTRA); Physical layer; Measurements (Release 16), (thus, by using the terminology of 3GPP), defining measurements of for example Reference Signal Received Power, RSRP, and Reference Signal Received Quality, in the PHY layer; an RRC_CONNECTED UE in LTE (also called EUTRA) can be configured by the network to perform measurements and, upon triggering measurement reports the network may send a handover command to the UE. In LTE this is configured in an RRConnectionReconfiguration, with a field called mobilityControlInfo, and in NR in an RRCReconfiguration, with a reconfigurationWithSync field.

These reconfigurations are actually be prepared by the target cell upon a request from the source node (over X2 interface in case of EUTRA-EPC or Xn interface in case of EUTRA-5GC or NR) and takes into account the existing RRC configuration the UE has with source cell (which are provided in the inter-node request). Among other parameters that reconfiguration provided by target contains all information the UE needs to access the target cell, e.g., random access configuration, a new C-RNTI assigned by the target cell and security parameters enabling the UE to calculate new security keys associated to the target cell so the UE can send a handover complete message on SRB1 (encrypted and integrity protected) based on new security keys upon accessing the target cell.

Both in LTE and NR, some principles exist for handovers (or in more general terms, mobility in RRC_CONNECTED):

Mobility in RRC_CONNECTED is Network-based as the network has best info regarding current situation such as load conditions, resources in different nodes, available frequencies, etc. Network can also take into account the situation of many UEs in the network, for a resource allocation perspective.

Network prepares a target cell before the UE accesses that cell. Source provides UE with the RRC configuration to be used in the target cell, including SRB1 configuration to send HO complete.

UE is provided by target with a target C-RNTI i.e. target identifies UE from MSG.3 on MAC level for the HO complete message. Hence, there is no context fetching, unless a failure occurs.

To speed up the handover, network provides needed information on how to access the target e.g. RACH configuration, so the UE does not have to acquire SI prior to the handover.

UE may be provided with CFRA resources, i.e. in that case target identifies the UE from the preamble (MSG.1). The principle behind here is that the procedure can always be optimized with dedicated resources. In CHO that might be a bit tricky as there is uncertainty about the final target but also the timing.

Security is prepared before the UE accesses the target cell i.e. Keys must be refreshed before sending RRC Connection Reconfiguration Complete message, based on new keys and encrypted and integrity protected so UE can be verified in target cell.

SUMMARY

The amount of measurements continuously transmitted from for example a wireless device, also referred to as User Equipment, UE, to other network entities, such as for example a Radio Access Network node, RAN node, also referred to as base station, eNB, gNB or simply network node, of a communications network is increasing with every generation of mobile communications architecture. This leads to a huge amount of data and information being transmitted over communications networks in order to enable efficient communication, for example by enabling link adaptation, beam forming, scheduling, parameter tuning amongst others. These periodically, or on request, transmitted measurement reports provide quite accurate and fine-grained measurement data. However, at the same time it generates a significant load in the network which may affect performance, and decrease overall efficiency, of the communications network.

The present disclosure relates to computer implemented methods for reducing data transmission in a communications network by compression of measurements of network characteristics of the communications network, wherein the measurements are performed by a wireless device, and wherein the wireless device is operable to transmit and receive signals, i.e. via wireless communication, over the communications network. Communicating wirelessly may involve transmitting and/or receiving wireless signals using electromagnetic waves, radio waves, infrared waves, and/or other types of signals suitable for conveying information through air.

More particularly, on a high level, the present disclosure proposes a Machine Learning, ML, based method for compression of measurement report data, herein generally referred to as of measurements of network characteristics, in mobile networks, herein generally referred to as communications network. Such approach helps to reduce amount of transmitted data by transmitting compressed versions of measurement report times-series and may enable that more detailed information about for example the radio conditions of a wireless device can be communicated. Moreover, exemplary proposed embodiments enable dynamically configurable accuracy thresholds that determines compression ratio based on network, application and/or implementation requirements. The amount of measurement data provided by for example wireless devices may be varied according to current requirements. The disclosure also proposes a learning scheme for adapting the frequency, or rate, of data compression based on several features such as for example accuracy level requirements. Yet further embodiments of the disclosure propose an approach for online model update in order to keep the encoder and decoder models, of the applied autoencoder model, up to date and to adapt to the dynamics of the environment.

The present disclosure provides the exemplary advantage that compression of measurement reports potentially leads to reduction of the amount of control traffic that has to be transmitted in the communications network. Reduced transmission is advantageous since the overall network load will be reduced. This reduction in overall network load may either by utilized by allowing more detailed or fine-granular measurement reports to be transmitted, or will simply reduce the overall data load of the communication network, potentially increasing overall network performance.

To give a few examples; if required, network entities or base stations may be provided with more, or more fine-granular, information referring to conditions experienced by respective wireless device. Yet an exemplary advantage is that more aggregated measurements can be forwarded in respective transmitted, compressed measurement report, thus all information required by for example a network entity, such as a base station, can be reporting at once instead having to be put in que. Moreover, using compression technique might allow including more types of the measurements, for instance unfiltered L1 time-series, which can be used for data analytics of the network, subsequent improvements of the network configuration. A further exemplary advantage of the disclosure is overall energy savings, and less overhead.

An object of the present disclosure is reached by at least one of the following methods:

According to a first aspect of the present disclosure, the disclosure relates to a computer implemented method for reducing data transmission in a communications network by compression of measurements of network characteristics of the communications network, performed by a wireless device, wherein the wireless device is operable to transmit and receive signals over the communications network, comprising the method steps of:

obtaining a trained encoder, of a trained autoencoder, performing a measurements of network characteristics, applying the trained encoder to compress the measurements of network characteristics, whereby a compressed representation of the measurements of network characteristics is generated, and

transmitting the compressed representation of measurements of network characteristics towards a network entity.

According to a second aspect of the present disclosure, the disclosure relates to a computer implemented method for reducing data transmissions in a communications network by compression of measurements of network characteristics of the communications network, performed by a network entity, wherein the network entity is operable to transmit and receive signals over the communications network, comprising the method steps of:

obtaining a trained decoder of a trained autoencoder, receiving a compressed representation of a measurements of network characteristics, transmitted by a wireless device, wherein the compressed representation of the measurements of network characteristics has been compressed using a trained encoder of the trained autoencoder, and wherein the compressed representation of the measurements of network characteristics of the communication network comprises compressed measurements of network characteristics performed by a wireless device, and applying the trained decoder to reconstruct the compressed representation of the measurements of network characteristics, whereby reconstructed measurements of network characteristics is generated.

According to a third aspect of the present disclosure, the disclosure relates to a computer implemented method for training an autoencoder, wherein the autoencoder comprises an encoder and a decoder, and wherein the autoencoder is applied for reducing data transmissions in a communications network, performed by a computer device, wherein the method comprises the method steps of:

obtaining training data comprising measurements of network characteristics, performed by a wireless device, of a communications network, using the obtained training data to train the encoder and decoder of the autoencoder, whereby: the encoder is trained to compress the measurements of network characteristics to generate a compressed representation of measurements of network characteristics, and the decoder is trained to reconstruct the compressed representation of measurements of network characteristics, whereby a trained encoder and trained decoder is obtained.

According to a fourth aspect of the present disclosure, the disclosure relates to a wireless device, operable to transmit and receive signals over a communications network, the wireless device comprising processing circuitry configured to enable the wireless device to perform a method comprising the steps of:

obtain a trained encoder, of a trained autoencoder, perform a measurements of network characteristics of the communications network, apply the trained encoder to compress the measurements of network characteristics, whereby a compressed representation of measurements of network characteristics is generated, and transmit the compressed representation of measurements of network characteristics towards a network entity.

According to a fifth aspect of the present disclosure, the disclosure relates to a network entity, operable to transmit and receive signals over a communications network, the network entity comprising processing circuitry configured to enable the network entity to perform a method comprising the steps of:

obtain a trained decoder of a trained autoencoder, receive a compressed representation of a measurements of network characteristics of the communication network, transmitted by a wireless device, wherein the compressed representation of the measurements of network characteristics has been compressed using a trained encoder of the trained autoencoder, and wherein the compressed representation of the measurements of network characteristics comprises compressed measurements of network characteristics performed by a wireless device, and apply the trained decoder to reconstruct the compressed representation of the measurements of network characteristics, whereby reconstructed measurements of network characteristics is generated.

According to a sixth aspect of the present disclosure, the disclosure relates to a computer program product comprising a computer readable medium carrying a computer program, the computer program comprising computer executable instructions, the computer executable instructions being configured such that, on execution by a computer device, processing circuitry and/or processor, the computer device, processing circuitry and/or processor performs any one of, or a combination of, the methods as disclosed herein.

Further objects mentioned above has moreover been solved by at least one of the embodiments described in the detailed description.

DETAILED DESCRIPTION

Figure 1:
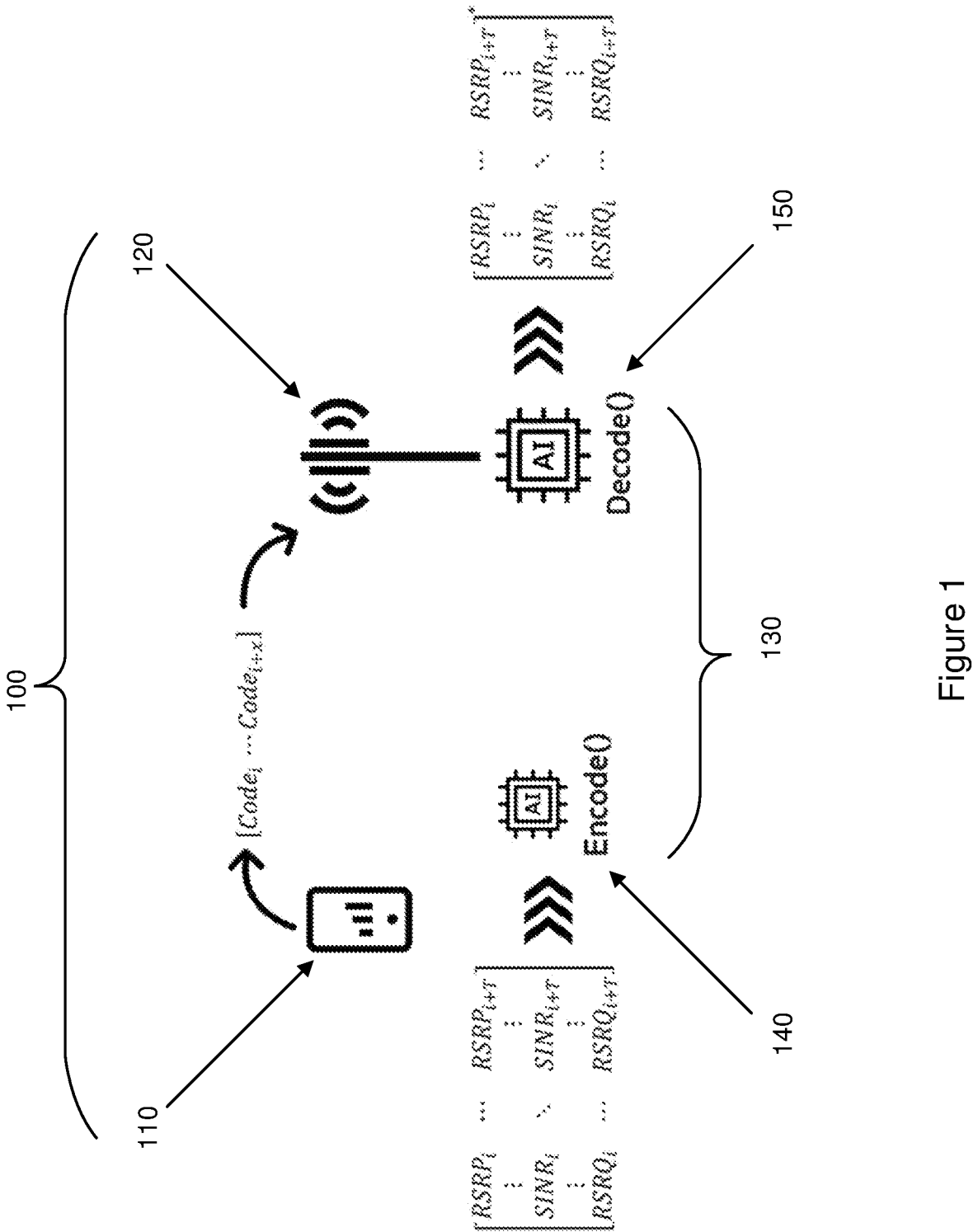
FIG. 1 schematically discloses an overview of an embodiment of a communications network in which an embodiment of a method according to the disclosure is executed, FIG. 2 to FIG. 7 schematically discloses exemplary embodiments of methods performed by wireless devices according to the disclosure, FIG. 8 to FIG. 13 schematically discloses exemplary embodiments of methods performed by network entities according to the disclosure, FIG. 14 schematically discloses the logic of an autoencoder, FIG. 15 schematically discloses the logic of a neural network, FIG. 16 schematically discloses an exemplary embodiment of a training method according to the disclosure.

Aspects of the present disclosure will now be described more fully with reference to the accompanying figures. The different devices, systems, entities, computer programs and methods disclosed herein may, however, be realized in many different forms and should not be construed as being limited to the aspects and embodiments set forth herein. Like numbers in the drawings refer to like elements throughout the description.

In the following description, for purposes of explanation and not limitation, specific details are set forth in order to provide a thorough understanding of the present disclosure. It will be apparent to the skilled person that the present disclosure may be practiced in other embodiments that depart from these specific details and embodiments provided.

The skilled person will further appreciate that the steps, services and functions explained herein below may be implemented using individual hardware circuitry, using software functioning in conjunction with for example a programmed micro-processor or general purpose computer, using one or more Application Specific Integrated Circuits, ASICs, and/or using one or more Digital Signal Processors, DSPs. This will be further discussed below. It will also be appreciated that when the present disclosure is described in terms of a method, it may also be embodied in one or more processors and one or more memories coupled to the one or more processors, wherein the one or more memories are encoded with one or more programs that perform the steps, services and functions disclosed herein when executed by the one or more processors. When logic so allows, method steps may be performed in another order than what explicitly is indicated in the description below.

Embodiments herein relate to a communications network. Generally, the communications network (or telecommunications network) may comprise any one, or any combination of wireless links such as for example: Global System for Mobile Communications, GSM, Wideband Code Division Multiple Access, WCDMA, Long Term Evolution, LTE, WiFi, Bluetooth, New Radio, NR or other wireless technologies currently being developed or to be deployed in the future. The skilled person will appreciate that these are merely examples and that the communications network may comprise other types of links.

In the herein discussed figures, optional method steps of the various embodiments of the disclosure discussed are generally indicated by being presented as dashed boxes.

In large, the present disclosure relates to interactions, such as transmission of various messages and/or information, generally referred to as communication, between wireless devices and network entities. However, as is apparent for the skilled person, according to embodiments, such transmissions may be relayed via one or more additional network components such as for example various forms of relay nodes. Such relay nodes may either just forward communication or may receive the communication, in some way process the communication by for example extracting of adding information to the communication, and subsequently forward the communication. Herein, such relay nodes are only discussed in relation to that communication may be transmitted to/via or received from/via a central unit, but it is considered to be obvious that also embodiments where other relay nodes, processing or not processing communication passing through such node, are within the scope of the present disclosure. It is further considered to be apparent for the skilled person, and thus within the scope of the present disclosure, that for embodiments wherein communication may be transmitted to/via, or received from/via a central unit, that the central unit has been provided with respective communication forwarded from a wireless device or a network entity. Central units will be discussed more in detail below.

FIG. 1 schematically discloses an overview of an embodiment of a method according to the disclosure. FIG. 1 disclose a wireless device 110 and a network entity 120 of a communications network 100. As previously mentioned, the communications network 100 may comprise any one, or any combination of wireless links such as for example: Global System for Mobile Communications, GSM, Wideband Code Division Multiple Access, WCDMA, Long Term Evolution, LTE, WiFi, Bluetooth, New Radio, NR or other wireless technologies currently being developed or to be deployed in the future. The skilled person will appreciate that these are merely examples and that the communications network may comprise other types of links. The wireless device 120 may for example operate in accordance to standards set out in 3GPP specifications, whereby they perform a number of measurements on recurring basis. As indicated in FIG. 1, what may be measured is for example, but not restricted thereto, Reference Signal Received Power, RSRP, Signal to Interference plus Noise Ratio, SINR, and Reference Signal Received Quality, RSRQ. Such measurements are herein generally referred to as measurements of network characteristics of a communications network. As is disclosed herein, RSRP, SINR and RSRQ are just exemplary parameters that may be included in network characteristics of a communications network, but for simplicity, when hereinafter discussing FIG. 1, these parameters are referred to. The measurements performed by a wireless device 110 may, for example in addition to being used by the wireless device 110 to control and/or optimize operation of the wireless device 110, be transmitted to network entities 120 of the communication network 100, such as for example to what generally is referred to as Radio Access Network nodes, RAN nodes. At the network entity 120 the received measurements may for example be used for data analytics and/or for initiating a communications network procedure like handover or random access. These interactions are generally controlled by what is set out in 3GPP specifications.

However, given the large number of wireless device 110 and the large number of measurements performed, the transmission of the results of performed measurements sent between entities of a communications network causes a significant load to the network. This in turn has the effect that for example what information, i.e. what measured parameters, that can be included in such reports, the periodicity at which the reports are transmitted etc. is affected and have to be controlled. The present disclosure addresses this issue by means of applying an autoencoder 130. Autoencoders 130 will be discussed more in detail below, but in general terms an autoencoder 130 is an artificial neural network that takes in input, reduces the dimensionality of this input, and then outputs a reconstruction of this input. Autoencoders 130 comprises an encoder 140, or encoder part, encoding the input to a compressed representation of the input, and a decoder 150, or decoder part, decoding or reconstructing the compressed representation. By distributing the encoder 140 to the wireless device 110, and the decoder 150 to the network entity 120, it is possible to encode, or compress, the results of for example RSRP, SINR and RSRQ measurements performed by the wireless device 110, and transmit the encoded, compressed representation of the measurements to the network entity 120, where the compressed representation is decoded. Thereby the amount of data transmitted is reduced, lowering the overall load of the network.

FIG. 1 schematically discloses one exemplary mode of carrying out the present disclosure, in which the wireless device 110 uses the encoder 140, of the autoencoder 130, to compress measurements of network characteristics of the communications network 100, in form of RSRP, RSRQ and SINR, where after the compressed representation of the network characteristics are transmitted towards a network entity 120, using the decoder 150, of the autoencoder 130, to decode, thus decompress and reconstruct, the compressed representation. The measurements of RSRP, RSRQ and SINR time-series data has been performed by the wireless device 110.

Embodiments of the disclosure will now be described, amongst others when referring to the herein discussed figures, from viewpoint of a wireless device and a network entity, starting from viewpoint of a wireless device.

Figure 2:
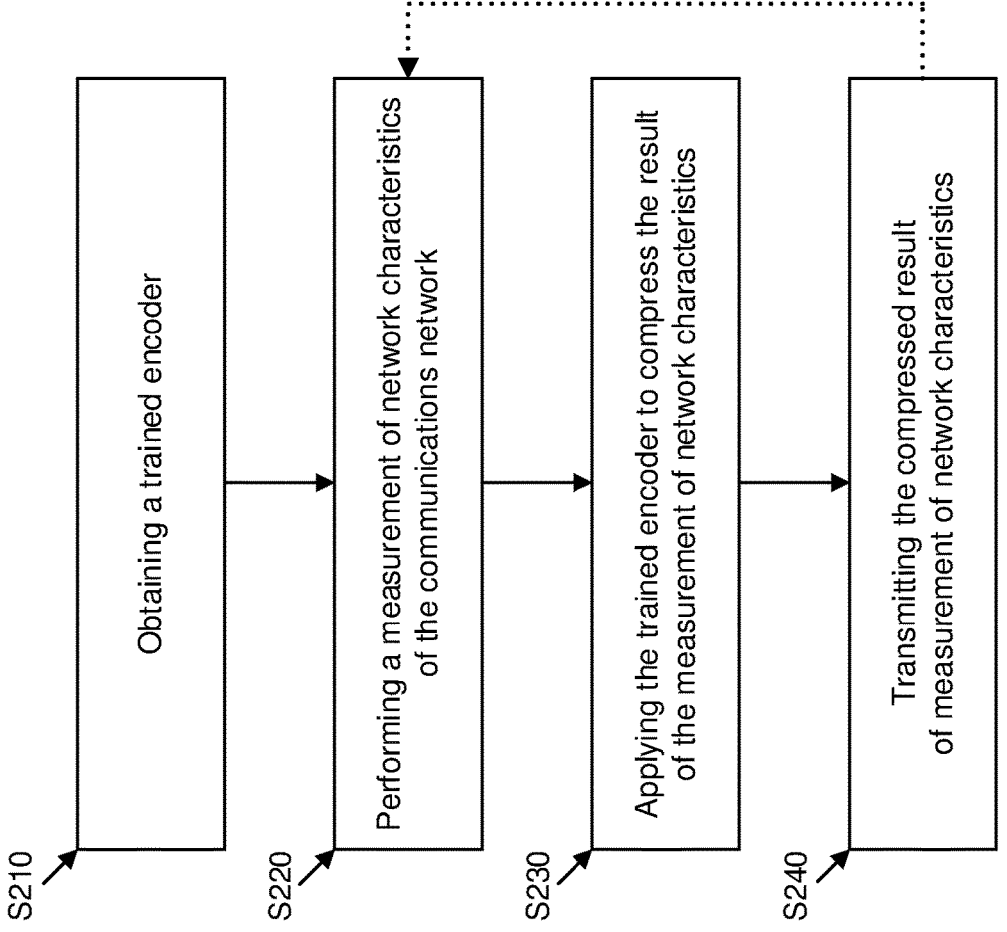

FIG. 2 schematically shows an embodiment of a method performed by a wireless device according to the disclosure. The embodiment relates to a computer implemented method for reducing data transmission in a communications network by compression of measurements of network characteristics of the communications network, the method being performed by a wireless device, wherein the wireless device is operable to transmit and receive signals over the communications network, the method comprising the method steps of:

S210 obtaining a trained encoder, of a trained autoencoder,

S220 performing a measurements of network characteristics,

S230 applying the trained encoder to compress the measurements of network characteristics, whereby a compressed representation of measurements of network characteristics is generated, and S240 transmitting the compressed representation of measurements of network characteristics towards a network entity.

The disclosure is not restricted to performing the method steps of: S210 obtaining a trained encoder, and S220 performing a measurements of network characteristics, in that specific order, but the order in which these method steps is performed may also be the other way around. According to embodiments of the method the step of obtaining a trained encoder may also comprise the method step of storing the trained encoder at the wireless device in order to enable that the encoder subsequently is used to compress the result of the measurements of network characteristics, i.e. enabling the method step above defined as applying the trained encoder.

According to embodiments the compressed representation of measurements of network characteristics may be transmitted to more than one network entity.

As previously mentioned, a wireless device, and also other entities of a communications network, operable in for example LTE or NR communications system compliant to 3GPP specifications is configured to continuously perform measurements of a number of parameters, network characteristics etc. enabling network conditions, ongoing network operations etc. to be determined and controlled. Such measurements are generally aggregated into various measurement reports which are distributed in the communications system. Specification of what are measured by for example wireless devices, what is measured and what may be included in the measurement reports are for example specified in 3GPP TS 36.214, V16.0.0 (2020-01), 3rd Generation Partnership Project; Technical Specification Group Radio Access Network; Evolved Universal Terrestrial Radio Access (E-UTRA); Physical layer; Measurements (Release 16), or later releases thereof, which for example defines measurements on the physical layer, generally referred to as PHY layer, such as for example RSRP and RSRQ, and 3GPP TS 36.311, V16.0.0 (2020-04), 3rd Generation Partnership Project; Technical Specification Group Radio Access Network; Evolved Universal Terrestrial Radio Access (E-UTRA); Radio Resource Control (RRC); Protocol specification or later releases thereof, which for example relates to Radio Resource Control protocol for the radio interface between UE and E-UTRAN as well as to the radio interface between RN and E-UTRAN, and comprises measurement configuration and measurement event description for UEs, i.e. wireless devices. What information that is included in a measurement report may for example be determined by what is requested by the network entity or network node requesting the report and/or what the measurement report is intended for. Measurement reports transmitted by wireless devices are generally sent periodically or event based, meaning when an event or action taken in the communications network triggers such measurements being performed and such reports being transmitted. The measurement reports may for example enable handover of a wireless device operating over a first network node, source network node, to a new network node, target network node.

Herein, the various information and data that may be included in reports of measurements performed, i.e. what may be referred to as measurement reports, result of measurements etc., is generally simply referred to as measurements of network characteristics. Examples of specific parameters and/or characteristics that may be included in the measurement reports will be provided below.

According to embodiments, when herein referring to transmission of result of network characteristics measurements, such transmissions are performed to comply with the same security regulations, and by applying the same security procedures, as generally used when transmitting for example measurement reports according to procedures regulated by 3GPP. Such procedures are for example defined in previously referred to 3GPP TS 36.331, which in addition to referring to for example Radio Resource Control protocol for the radio interface between UE and E-UTRAN as well as to the radio interface between RN and E-UTRAN, and comprising measurement configuration and measurement event description for UEs, relates to for example security procedures and activations.

According to embodiments, the result of network characteristics may be tagged with information identifying at least one device characteristic from a non-exhaustive list of device characteristics comprising; group ID, area ID, type of device, primary use of device or device ID.

According to embodiments of the present disclosure, what measured parameters and network characteristics that are included in the network characteristics may for example be dependent on what information that is required and useful when performing desired operations at the network entity, restrictions in data transmission, memory restrictions and/or power consumption restrictions.

According to embodiments, the method steps, performed by a wireless device, of:

S220 performing a measurements of network characteristics,

S230 applying the trained encoder to compress the measurements of network characteristics, whereby a compressed representation of the measurements of network characteristics is generated, and S240 transmitting the compressed representation of measurements of network characteristics towards a network entity, are repeated when measuring of network characteristics is triggered. Thus, according to embodiments, at least some times, according to some embodiments always, when measuring of network characteristics is triggered, and the method step of S220 performing a measurements of network characteristics, is performed, the encoder implemented at the wireless device is applied to compress such measurements of network characteristics before the compressed representation is transmitted towards a network entity. This is schematically indicated in FIG. 2 by that a potted line loops method steps S220, S230 and S240. Thus, according to embodiments method step S210 obtaining a trained encoder, of a trained autoencoder, is not performed every time the method is executed. Once the wireless device has obtained, and implemented, a trained encoder, by any of the herein disclosed ways an encoder may be obtained, performing this method step may not be required. Repeatedly performing method steps S220, S230 and S240 has the exemplary advantage that the total amount of data transmitted by the wireless device performing the method steps is reduced.

According to further embodiments, the result of measurements of network characteristics can be represented as multi-dimensional time series data.

Figure 3:
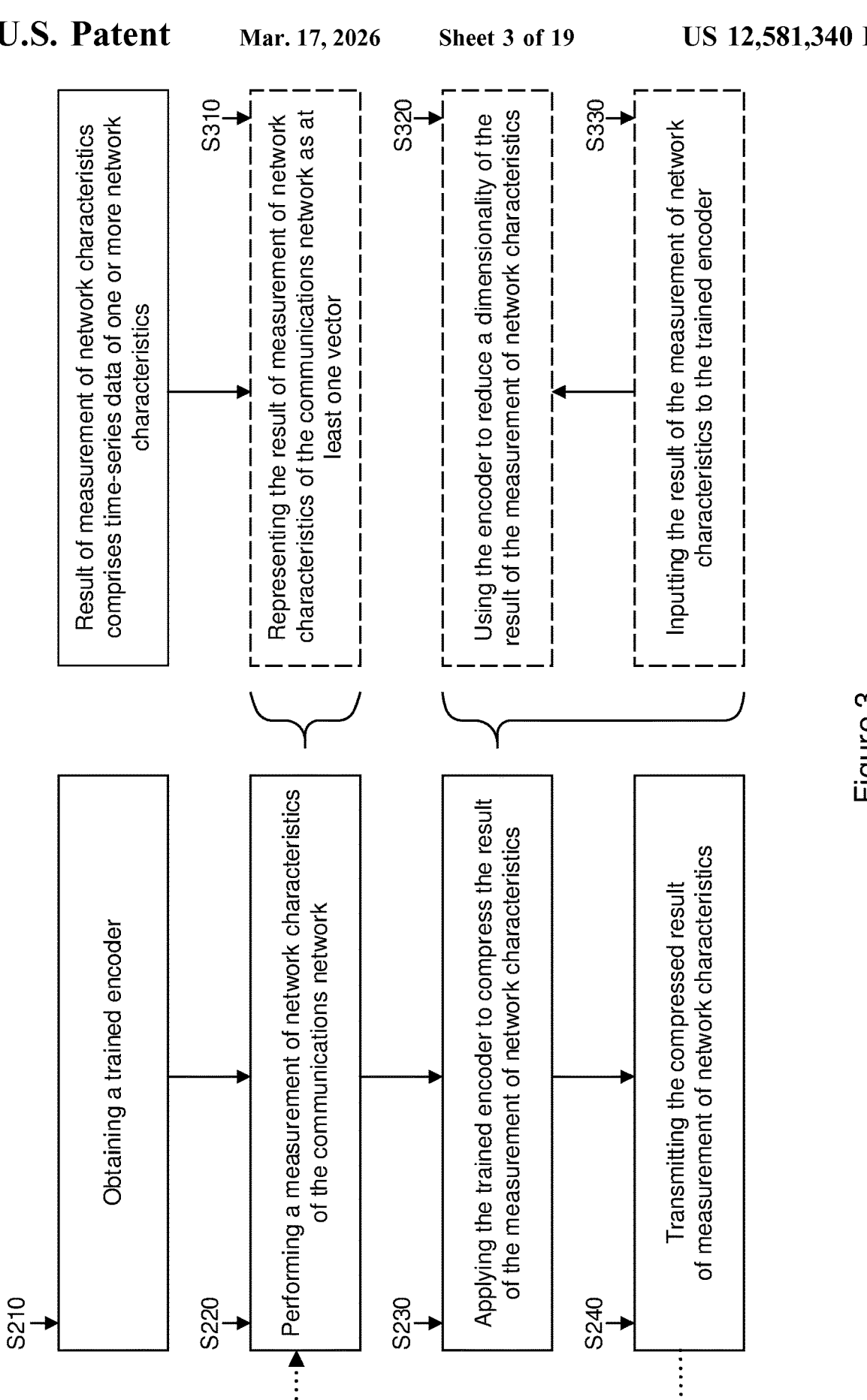

Referring to FIG. 3, referring to embodiments of methods performed by a wireless device, according to embodiments, before the trained encoder is applied, the method may comprises the method step of S310 representing the measurements of network characteristics as at least one vector, whereby it is the at least one vector, comprising the measurements of network characteristics, that the trained encoder is applied to compress. Thus, the method step of: S310 representing the result of measurements of network characteristics of the communications network as at least one vector can be seen as a sub-method step of: S220 performing a measurements of network characteristics of the communications network. Among others, depending on what network characteristics and parameters that has been measured and that are included in the network characteristics, and the amount of network characteristics and parameters included, the result of measurements of network characteristics may for example be represented by on a single vector, a plurality of vectors and/or a matrix. According to embodiments the measurements of network characteristics comprises time-series data of one or more network characteristics of one or more network cells of the communications network.

According to embodiments the encoder has been trained together with a decoder of the same autoencoder, and the encoder and the decoder have been trained using at least training data comprising measurements of network characteristics performed by a wireless device. The training data may be pre-collected network characteristics for the specific purpose of being used to train the autoencoder, or may have been collected with another primary purpose. According to embodiments, the training data is collected during a period where the communications network is operating under normal conditions, thus conditions reflecting how the communications network is operating the predominant part of the time. According to other embodiments the training data reflects as many as possible of the various measurement outcomes, parameter values etc. that the autoencoder, when being applied, may be exposed to. Also, as will be discussed more in detail below, part of the available training data may actually be set aside to be used only for verification of the performance of the trained autoencoder, generally referred to as test data. Thus, the training data used to train the encoder and decoder may actually just be a part, however comprising the greater part of the available data, of all available data.

Figure 4:
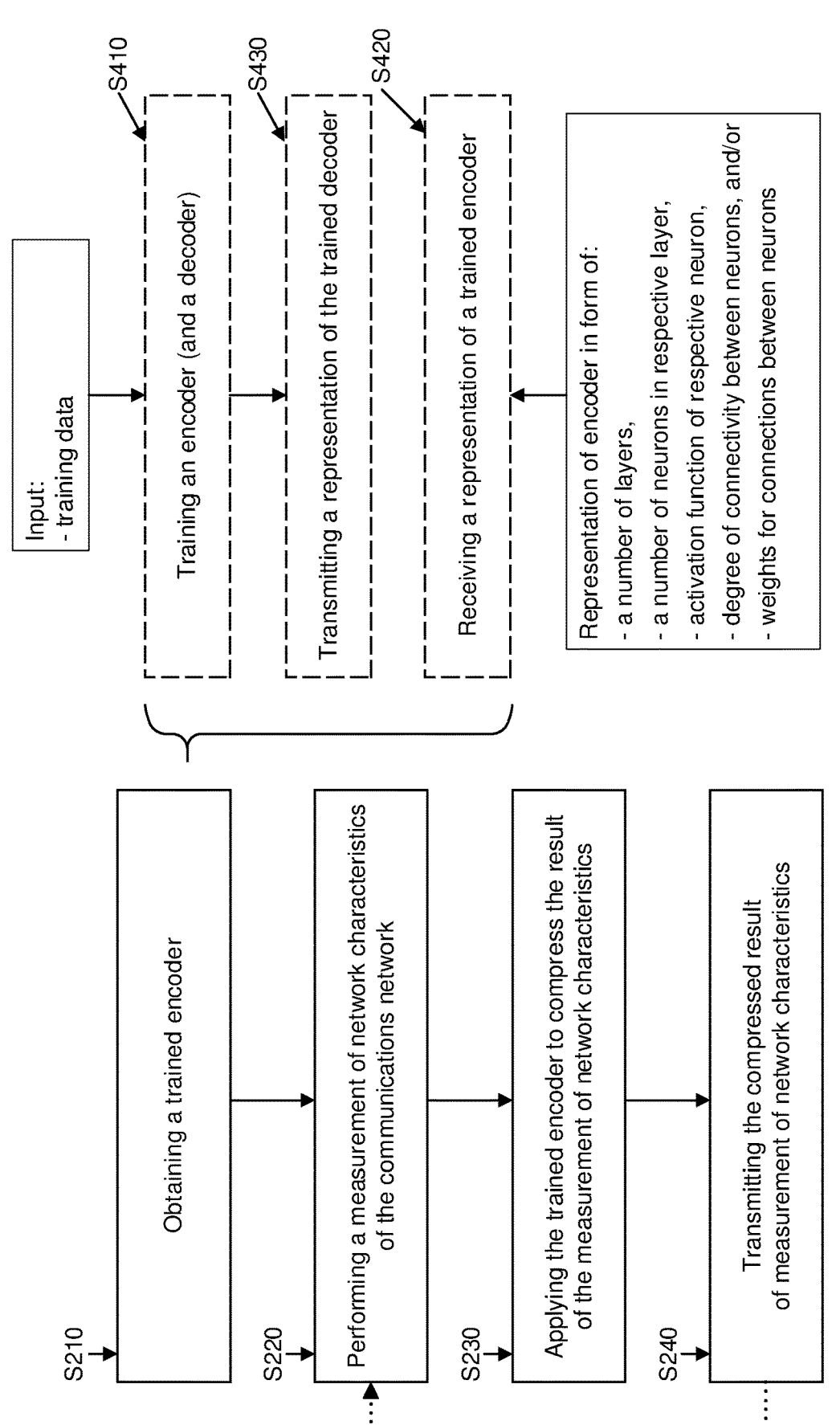

FIG. 4 schematically shows embodiments of methods for obtaining a trained encoder of a trained autoencoder, performed by a wireless device. FIG. 4 discloses two embodiments of how such an encoder may be obtained. According to the shown embodiments the method step of:

S210 obtaining a trained encoder of a trained autoencoder, comprises either the method step of:

S410 training an encoder and a decoder of an autoencoder, by using the training data comprising measurements of network characteristics performed by a wireless device, or the method step of:

S420 receiving a representation of the trained encoder, wherein the trained encoder is transmitted from a network entity or a central unit. According to the latter embodiment, the wireless device deploys a received representation of a trained encoder.

As is schematically indicated in FIG. 4, according to embodiments the training data may be used as input to the method step of S410 training an encoder and a decoder of an autoencoder.

As further is schematically shown in FIG. 4, for embodiments where the method step of: S210 obtaining a trained encoder of an autoencoder, is performed by performing the method step of: S410 training an encoder and a decoder of an autoencoder, and wherein such training is performed at the wireless device, the method may further comprise the step of:

S430 transmitting a representation of the trained decoder of the trained autoencoder towards a network entity. According to embodiments, the trained decoder may be transmitted towards the network entity via a central unit. Thereby the network entity, receiving the decoder either directly from the wireless device or via a central unit, is provided access to the decoder that has been trained together with the trained encoder, securing that the encoder and decider are synchronized. By implementing and applying that decoder at the network entity, the network entity is capable of decoding, or reconstructing, the compressed representation of network characteristics measurement reports, encoded at, or compressed at, and transmitted by, the wireless device. According to embodiments, it may be advantageous to train the autoencoder at a network entity, or central unit, instead of at a wireless device since there may be less limitations or restrictions in regard to energy consumption, computational resources, memory capacity etc. at the network entity. Such embodiments will be discussed below. According to embodiments the representation of the trained decoder of the trained autoencoder may be transmitted to more than one network entity.

Referring once more to FIG. 4, according to one embodiment the method step of obtaining a trained encoder by receiving a representation of an encoder comprises obtaining at least one of, but not restricted to: a number of layers of the trained encoder, a number of neurons in respective layer of the trained encoder, activation function of respective neuron of the trained encoder, degree of connectivity between neurons of the trained encoder, i.e. scale of connectedness and complexity, type of layer of respective layer and/or weights for connections between neurons of the trained encoder.

According to embodiments, different layers of the neural network may be of different types. According to embodiments, the scale of connectedness between neurons of the encoder may be anywhere between fully connected, meaning that respective neuron of a hidden layer of the neural network are connected to all neurons of the previous layer and to all neurons of the subsequent layer, to being designed as a Convolutional Neural Network, CNN, relying on local spatial coherence and using convolution in place of general matrix multiplication for one or more layers. CNNs have at least one layer of convolutional layer type. Fully connected neural networks learns from by combining all possible combinations, which may be advantageous for some implementations, whereas CNNs may, in some implementations, reduce the risk of overfilling and generally requires less computational power. Other types of layers may for example be dense layers or pooling layers, just to mention a few. The logics behind neural networks, autoencoders, and training of autoencoders, will be discussed more in detail below.

Referring to FIG. 3 again, according to embodiments, the method step of: S230 applying the trained encoder to compress the measurements of network characteristics, whereby a compressed representation of measurements of network characteristics is generated, may comprise the method step of: S320 using the encoder to generate a compressed representation of the measurements of network characteristics. This method step can also be defined as that the method step of applying the trained encoder to compress the measurements of network characteristics, whereby a compressed representation of measurements of network characteristics is generated, comprises the further method step of S330 inputting the measurements of network characteristics to the trained encoder, whereby the dimensionality of the result of the measurements of network characteristics is reduced. Reducing the dimensionality, also referred to as dimensionality reduction, may be defined as the process of reducing the number of features describing a particular set of data. Dimensionality reduction may be accomplished using any one of a number of different methods such as for example Principal Component Analysis, PCA. The process may be explained by operation of inputting the vector comprising the result of the measurements of network characteristics to or into the encoder of the autoencoder. This may also be expressed as that the encoder part of the autoencoder is applied to the vector comprising the result of the measurements of network characteristics whereby a compressed representation is generated.

Aspects of the present disclosure relates to methods for updating and/or selecting the most suitable autoencoder out of currently available autoencoders. According to embodiments, updating or implementing a second autoencoder are done online, i.e. without interrupting the operation of neither wireless devices nor network entities involved. Obviously, what is important when the applied autoencoder is updated or changed is that the both the wireless devices and the network entities are provided with encoders and decoders that are synchronized.

Figure 5:
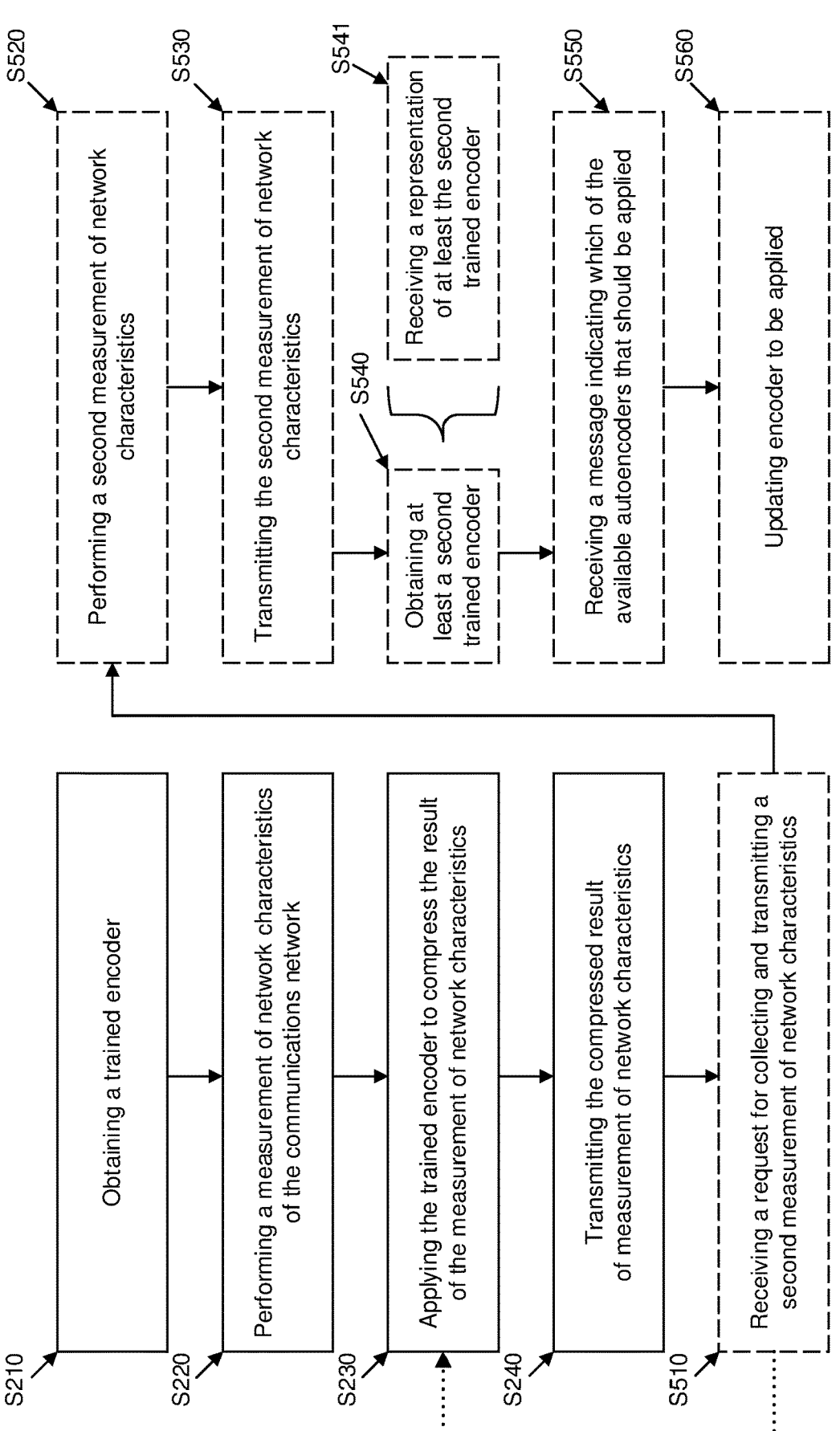

Referring now to FIG. 5, schematically disclosing embodiments of an exemplary method the disclosure wherein the wireless device performs a method further comprising the method step of:

S510 receiving a request for collecting and transmitting a second measurements of network characteristics of the communication network, wherein the request is transmitted from a network entity and/or a central unit.

According to embodiments, the second measurements of network characteristics refer to the same parameters and characteristics as included in the previously referred to network characteristics of communications network.

According to further embodiments, the above-mentioned method step of the wireless device receiving a request for collecting and transmitting a second measurement may trigger the further method steps of:

S520 performing a second measurements of network characteristics of the communications network, wherein such measurement is performed by the wireless device, and subsequently S530 transmitting the second measurements of network characteristics to a network entity and/or a central unit. As will be discussed below, the second measurements of network characteristics enables the reconstructed network characteristics measurement report to be compared to an actual measurement reports, i.e. to the second measurements of network characteristics. Thereby the accuracy of the reconstructed network characteristics can be determined, generally referred to model accuracy, which may be seen as an indication of the performance of the autoencoder. As will be discussed more in detail below, the model accuracy is preferably calculated at the network entity or at a central unit. If the model accuracy is too low this may trigger online update of the applied autoencoder, or, as is disclosed below, may trigger that another autoencoder, referred to as a second trained autoencoder, is implemented.

Still referring to FIG. 5, according to further embodiments, the method may further comprise the method step of:

S540 obtaining at least a second trained encoder of at least a second trained autoencoder, wherein the available autoencoders are differently configured. Obtaining at least a second trained encoder may also comprise storing the second trained encoder at the wireless device. As previously discussed, obtaining a second trained encoder of a second trained autoencoder, may comprises obtaining at least one of: a number of layers of the second trained encoder, a number of neurons in respective layer of the second trained encoder, activation function of respective neuron of the second trained encoder, degree of connectivity between neurons of the second trained encoder, type of layer of respective layer and/or weights for connections between neurons of the second trained encoder.

According to embodiments the wireless device may not only be provided with one additional, i.e. second, trained encoder but with more than one. The various encoders, or actually the various autoencoders of which the wireless device has been provided with respective encoder and a network entity has been provided with respective decoder, may be configured, or programmed, differently. According to embodiments, the difference in configuration, between respective available autoencoder, may, when respective autoencoder is applied, for example associate respective autoencoder with; specific compression ratio, specific algorithm complexity, specific computational resources requirements and to a specific compression-reconstruction accuracy, also referred to as model accuracy. Generally, the requirements of computational resources may be related to the energy consumed by respective autoencoder when being applied.

Herein, compression ratio is used to define the degree of compression, i.e. the degree of dimensionality reduction, an autoencoder provides. An obvious advantage of having more than one encoder, of more than one autoencoder, stored at the wireless device (and corresponding decoders stored at a network entity) is that, depending on what the reconstructed representation of measurements of network characteristics should be used for, the autoencoder providing for example the most suitable compression-reconstruction accuracy, i.e. the accuracy between the encoded, compressed measurements and the decoded, decompressed representation, and/or compression ratio, can be selected. Generally, the selection of autoencoder, and also the number of alternative encoders saved at the wireless device, is based on restraints or limitations related to the wireless device. Thus, the selection of autoencoder may for example also be based on available computational resources and/or storage capacity. Higher compression ratio, and higher compression-reconstruction accuracy, may be, but do not necessarily have to be, associated with more complex algorithms, which may, but do not necessarily have to, require more computational resources. For exemplary embodiments, given that for example the computational effort is constant, the compression-reconstruction accuracy of an autoencoder and the compression ratio of an autoencoder is inversely dependent, meaning the higher compression ratio, the lower compression-reconstruction accuracy.

According to embodiments of the disclosure the wireless device is only provided with a second encoder, in addition to the currently implemented encoder. This has the exemplary advantage that only one additional encoder has to be transmitted to, and stored at, the wireless device. According to embodiments the second encoder may be stored at the wireless device instead of the previously applied encoder, once which encoder that should be used has been selected.

According to further embodiments, a method performed by a wireless device may comprise the method step of:

S541 receiving a representation of at least the second trained encoder, wherein the at least second trained encoder is transmitted from a network node. According to embodiments the at least second trained encoder may also be transmitted from a central unit.

According to further embodiments the method may further comprise the method step of:

S550 receiving a message indicating which of the available autoencoders that should be applied, wherein the message is transmitted from a network entity or a central unit, and S560 updating encoder to be applied to be the encoder of the indicated available autoencoder.

Thus, according to the above referred to embodiment, which trained encoder, out of the available encoders, that is to be applied is determined at, or at least indicated by means of a message transmitted by, a network entity or a central unit. According to embodiments, it may be advantageous that the training of at least the second trained autoencoder is performed at a network entity, or at a central unit, where there presumably is less restrictions in terms of for example energy consumption, computational resources and storage. According to embodiments, this is particularly true if the training is performed at a central unit particularly designed or intended for such training.

The above stated methods refer to embodiments where at least a second autoencoder is trained, and subsequently provided to the wireless device at a network entity or a central unit. According to other, not shown, embodiments at least a second autoencoder may also be trained at the wireless device itself. According to such methods the method step of:

obtaining at least a second trained encoder of at least a second trained autoencoder, wherein the available auto-encoders are differently configured, comprises the method step of:

training at least the second encoder and at least a second decoder of at least the second autoencoder, by using training data comprising measurements of network characteristics of a communications network performed by a wireless device. The trained decoder of the trained autoencoder may subsequently be transmitted towards at least one network entity.

Figure 6:
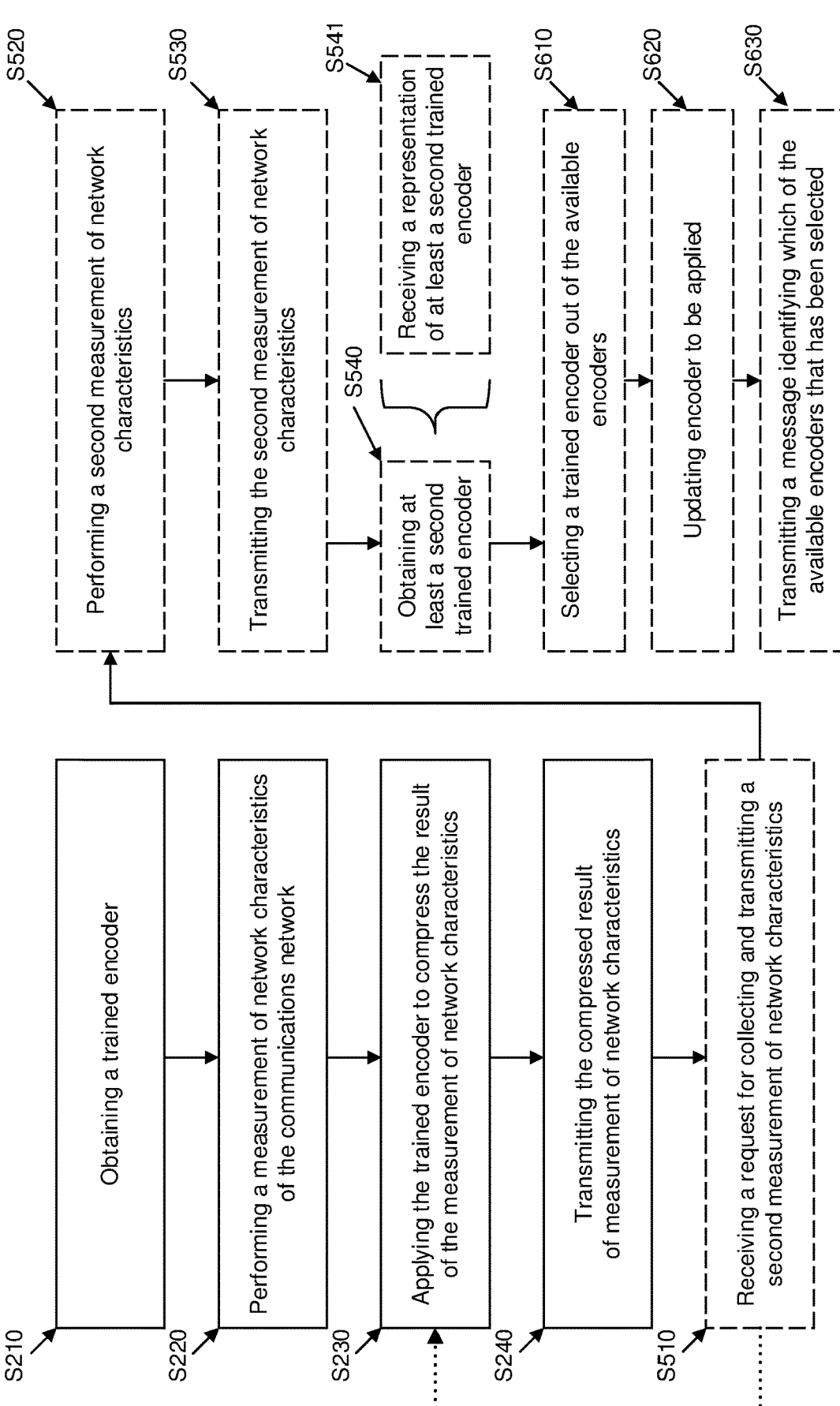

Referring now to FIG. 6, in many aspects being similar to FIG. 5, with the exception that the method steps referring to selecting which of the available autoencoders that should be used is performed at the wireless device instead of at the network entity. Thus, according to embodiments of the disclosure, which trained encoder, out of the available trained encoders, that is to be applied is determined at the wireless device. Such methods may comprise the method steps of:

S610 selecting a trained encoder out of the available encoders, wherein which trained autoencoder that is selected is based on at least one of: prevailing radio conditions, type of wireless device performing the method, type of service currently being provided by the wireless device performing the method, current state of charge of a battery of the wireless device performing the method, desired accuracy of reconstructed data, desired autoencoder compression ratio, and/or at least one network condition, wherein the at least one network condition is measurable by the wireless device, S620 updating encoder to be applied, and S630 transmitting towards the network entity a message identifying which of the available encoders that is selected for implementation. Thereby the network entity, receiving the compressed representation of measurements of network characteristics, is informed of which decoder that should be applied to decode or reconstruct the compressed representation of the measurements of network characteristics. Performing the method steps relating to selecting which of the available autoencoders that should be applied at the wireless device has the exemplary advantage that characteristics and properties of the wireless device, such as for example currently available computational power, available storage, battery charging level etc. can be considered, without having to transmit any additional data to a network entity and/or central unit. According to embodiments, which of the available encoders that is selected may be transmitted to multiple network entities.

The herein referred to at least one network condition may be, but is not limited to be, at least one of: SINR, RSRP, RSRQ, cell load, network congestion, number of active wireless devices fulfilling a predetermined criterion, resource utilization, channel variation and channel quality. In some embodiments a combination of the above referred to network conditions can be used. Number of active wireless devices fulfilling a predetermined criterion may for example be defined according to how many wireless devices that are served by one, or a number of, network entities, and/or the number of wireless devices of one particular type, such as for example UAVs or cellular phones.

According to further embodiments of the disclosure, as mentioned, instead of having at least two trained autoencoders to select from, updating applied autoencoder may be accomplished by means of an autoencoder update. An example of such an embodiment is disclosed in FIG. 7.

The update of the applied autoencoder, thus retraining of the autoencoder currently being applied or training of a second or updated autoencoder, is preferably performed at the network entity or central unit, whereby a trained encoder update subsequently is transmitted towards to wireless device. By implementing an updated autoencoder, an auto-encoder being better suited for the particular purpose, for example having higher compression-reconstruction accuracy, requiring less computational resources or being configured for providing higher compression ratio, can be used.

Figure 7:
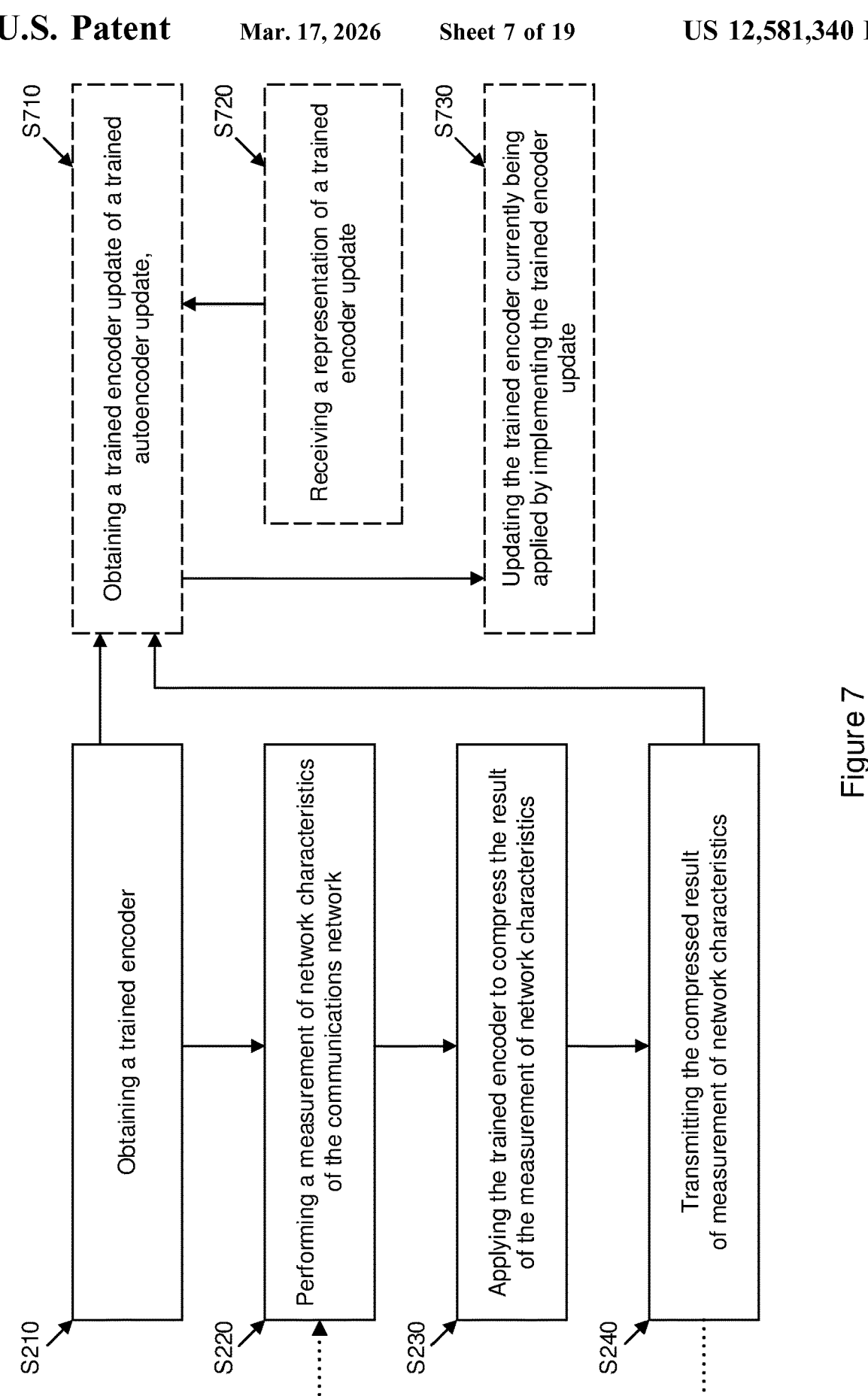

As is schematically shown in FIG. 7, according to embodiments of the disclosure, a method, performed by a wireless device, may comprise the method steps of:

S710 obtaining a trained encoder update of a trained autoencoder update, and

S730 updating the trained encoder currently being applied by implementing the trained encoder update. According to embodiments the method step of:

S710 obtaining a trained encoder update of a trained autoencoder update, may comprise the method step of:

S720 receiving a representation of a trained encoder update, wherein the representation of a trained encoder update is transmitted from a network node or a central unit. According to embodiments the representation of the trained encoder update may also be transmitted from a central unit.

As previously discussed, obtaining a trained encoder update of a trained autoencoder update, may comprises obtaining at least one of: a number of layers of the second trained encoder, a number of neurons in respective layer of the second trained encoder, activation function of respective neuron of the second trained encoder, degree of connectivity between neurons of the second trained encoder, type of layer of respective layer and/or weights for connections between neurons of the trained encoder update.

Yet an embodiment of the present disclosure, comprises that the method step of: S210 obtaining a trained encoder, of a trained autoencoder, comprises receiving a default trained decoder from a central unit.

This may for example be performed in conjunction with the wireless device being turned on or when the wireless device enters a coverage area of a network entity. Training the default autoencoder at the central unit has many advantages, for example, the central unit may collect and store large amounts of training data, i.e. measurements of network characteristics, collected over a long period of time from one or a plurality of wireless devices. Also, training of an autoencoder may be a quite computational and/or energy demanding operation. Storage capacity, computational resources and/or energy consumption are generally less limited at a central unit.

When above referring to trained encoder, out of the available encoders, what is considered is the trained encoder of respective available autoencoder, respective available autoencoder also comprising a trained decoder, trained together with the trained encoder. The encoder, of the selected autoencoder, is implemented at the wireless device and the decoder, of the same autoencoder, is implemented at the network entity.

It should be noted that when referring to training data used to train for example the autoencoder update and/or at least the second encoder this data may be collected by any wireless device, or by a plurality of wireless devices, either continuously, on periodical basis or on event-based basis. Training data is generally presented in the form of raw data. Even if not explicitly stated, when training of encoders and decoders of autoencoders is performed at a network entity, or at a central unit, it is considered obvious that such network entity, or central unit, is provided with the training data by, receiving training data collected by, and transmitted from, at least one wireless device, before training is initiated. Transmitting training data towards at least one network entity or central unit may for example be performed when the overall communications network load is low. The training data may be stored at the network entity, or central unit, and used when an operation requiring training data, such as for example training of an autoencoder update, is triggered.

Since the central unit generally is not as limited when it comes to storage capacity, as first and foremost a wireless device, but also a network entity, all training data may be stored at the central unit and transmitted to a network entity when an operation requiring training data is triggered at the network entity. The training data may, in addition to training data originally derived from measurements by a wireless device, comprise simulated data generated by link simulator models or similar, configured for generating such data.

Corresponding embodiments of method of the disclosure, above described from viewpoint of a wireless device, will now be described from viewpoint of a network entity. As is apparent for the skilled person, in general the advantages presented for embodiments of methods described from viewpoint of a wireless device applies also for corresponding method from viewpoint of e network entity.

Figure 8:
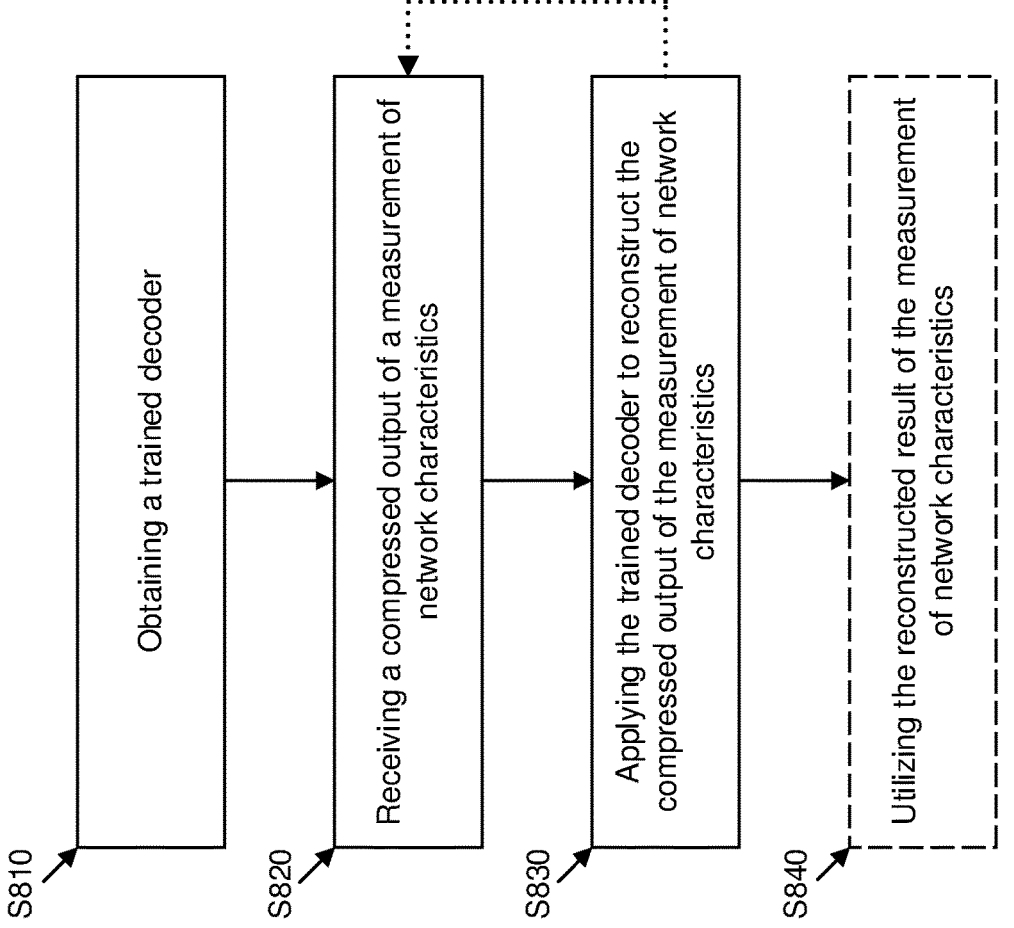

FIG. 8 schematically shows an exemplary embodiment of a method performed by a network entity according to the disclosure. The method disclosed in FIG. 8, performed by a network entity, is intertwined with the method disclosed in FIG. 2, which is performed by a wireless device. The exemplary embodiment of FIG. 8 relates to a computer implemented method for reducing data transmissions in a communications network, by compression of measurements of network characteristics of the communications network, performed by a network entity. The network entity is operable to transmit and receive signals over the communications network. The exemplary embodiments comprise the method steps of:

S810 obtaining a trained decoder of a trained autoencoder,

S820 receiving a compressed representation of a measurements of network characteristics, transmitted by a wireless device, wherein the compressed representation of the measurements of network characteristics has been compressed using a trained encoder of the trained autoencoder, and wherein the compressed representation of the measurements of network characteristics comprises compressed measurements of network characteristics performed by a wireless device, and S830 applying the trained decoder to reconstruct the compressed representation of the measurements of network characteristics, whereby reconstructed measurements of network characteristics is generated.

According to embodiments of the method the step of obtaining a trained decoder also comprises the method step of storing the trained decoder at the network entity in order to enable that the decoder subsequently is used to decoding, i.e. reconstruct or decompress, the compressed representation of measurements of network characteristics, thus enabling the method step above defined as applying the trained decoder.

According to embodiments, the method steps of:

S820 receiving a compressed representation of a measurements of network characteristics, transmitted by a wireless device, wherein the compressed representation of the measurements of network characteristics has been compressed using a trained encoder of the trained autoencoder, and wherein the compressed representation of the measurements of network characteristics of the communication network comprises compressed measurements of network characteristics performed by a wireless device, and S830 applying the trained decoder to reconstruct the compressed representation of the measurements of network characteristics, whereby reconstructed measurements of network characteristics is generated, are repeated each time the network entity receives a compressed representation of a measurements of network characteristics. Thus, according to embodiments, once the network entity has obtained a decoder, every time the network entity receives a compressed representation of measurements of network characteristics, transmitted by a wireless device, the network entity may apply the decoder to decode and reconstruct the compressed representation. This is schematically indicated in FIG. 8 by that a potted line loops method steps S820 and S830. Thus, according to embodiments method step S810 obtaining a trained decoder, of a trained autoencoder, is not performed every time the method is executed. Once the network entity has obtained, and implemented, a trained decoder, by any of the herein disclosed ways a decoder may be obtained, performing this method step may not be required.

According to further embodiments, also schematically shown in FIG. 8, the method, performed by a network entity, may optionally also comprise the method step of:

S840 utilizing the reconstructed measurements of network characteristics for performing at least one of: data analytics, initiate a network entity optimization procedure and/or initiate a communications network procedure. Herein, a network entity optimization procedure may be any procedure aiming to improve efficiency of operation, increase throughput, reduce congestion etc. by using information provided in the decoded representation of measurements of network characteristics that may be performed at the network entity. The procedure being initiated may be one of RRC protocol functions defined in previously referred to 3GPP TS 36.331, for example any one procedure from a non-exhaustive list of procedures including: paging, inter- or intra-frequency handover, random access, re-establishment, or any other RRC protocol functions.

According to embodiments the encoder has been trained together with a decoder of the same autoencoder, and the encoder and the decoder have been trained using training data comprising measurements of network characteristics, wherein the measurements have been performed by a wireless device. As has been discussed in relation to training of the encoder of the trained autoencoder, the training data may pre-collected network characteristics for the specific purpose of being used to train the autoencoder, or may have been collected with another primary purpose. According to embodiments, the training data is collected during a period where the communications network is operating under normal conditions, thus conditions reflecting how the communications network is operating the predominant part of the time.

Figure 9:
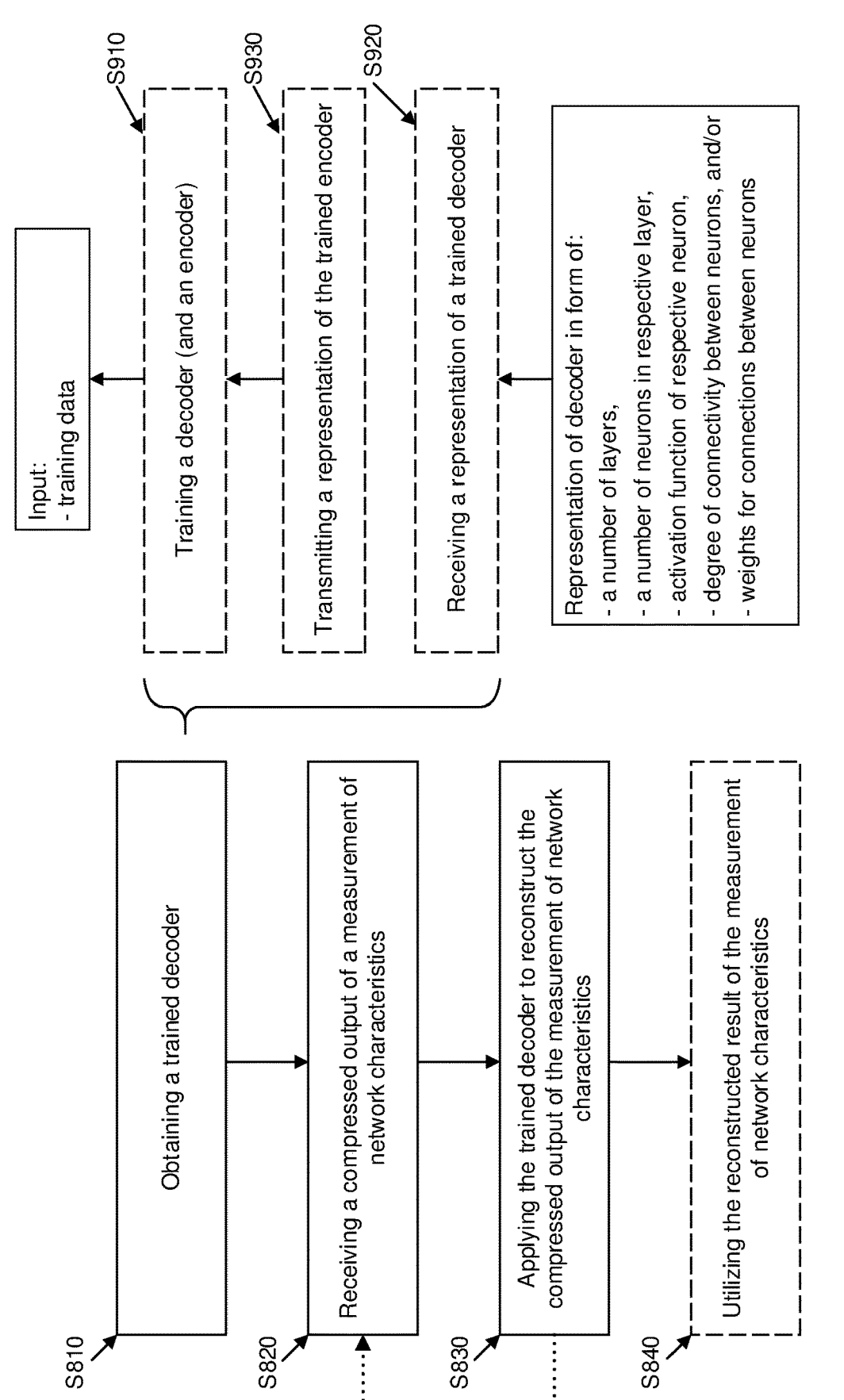

In coherence with what previously has been disclosed in relation to methods performed by a wireless device, the method step of:

S810 obtaining a trained decoder of a trained autoencoder, may be performed according to various embodiments. According to exemplary embodiments of the disclosure as schematically shown in FIG. 9, the method step of S810 obtaining a trained decoder of a trained autoencoder may comprise:

S910 training the decoder and an encoder of an autoencoder, by using training data comprising measurements of network characteristics, wherein the measurements have been performed by a wireless device of a communications network, and wherein the training data has been provided to the network entity from a wireless device prior to the training, or S920 receiving a representation of the trained decoder, wherein the trained decoder is transmitted from a wireless device. The trained decoder may also be transmitted from a central unit.

In the first embodiment of how the method step of: S810 obtaining a trained decoder of a trained autoencoder, is performed, an encoder and a decoder of an autoencoder are trained at the network entity, by using training data previously provided by a wireless device. A representation of the trained encoder is transmitted towards a wireless device to be used when compressing measurement of network characteristics. Corresponding trained decoder is implemented at, i.e. used by, the network entity. Thereby, when the wireless device has applied the received trained encoder to encode or compress measurements of network characteristics, and transmitted the compressed representation of measurements of network characteristics towards the network entity, the network entity is able to decode or reconstruct the compressed representation received from the wireless device, by applying the decoder. As is schematically indicated in FIG. 9, according to embodiments the training data may be used as input to the method step of S910 training a decoder and an encoder of an autoencoder.

Thus, according to further embodiments, the disclosure relates to a method, performed by a network entity, further comprising the step of:

S930 transmitting a representation of the trained encoder of the trained autoencoder towards a wireless device. According to embodiments the trained encoder may also be transmitted towards the wireless device via a central unit.

In the second embodiment of how the method step of: S810 obtaining a trained decoder of a trained autoencoder, is performed, i.e. by means of the method step of: S920 receiving a representation of the trained decoder, the network entity receives a representation of a trained decoder from a wireless device or a central unit, wherein the trained decoder is the trained decoder of the trained autoencoder of which the trained encoder is implemented at the wireless device. Thus, when the network entity receives a compressed representation of measurements of network characteristics, transmitted from the wireless device, the network entity is able to decode or reconstruct the representation by applying the trained decoder.

Still referring to FIG. 9, according to embodiments, the method step of obtaining a trained decoder by receiving a representation of an encoder comprises obtaining at least one of: a number of layers of the trained encoder, a number of neurons in respective layer of the trained encoder, activation function of respective neuron of the trained encoder, degree of connectivity between neurons of the trained encoder, i.e. scale of connectedness and complexity, type of layer of respective layer and/or weights for connections between neurons of the trained encoder.

The method disclosed in FIG. 9, performed by a network entity, in part mirrors the method disclosed in FIG. 4, which is performed by a wireless device.

Figure 10:
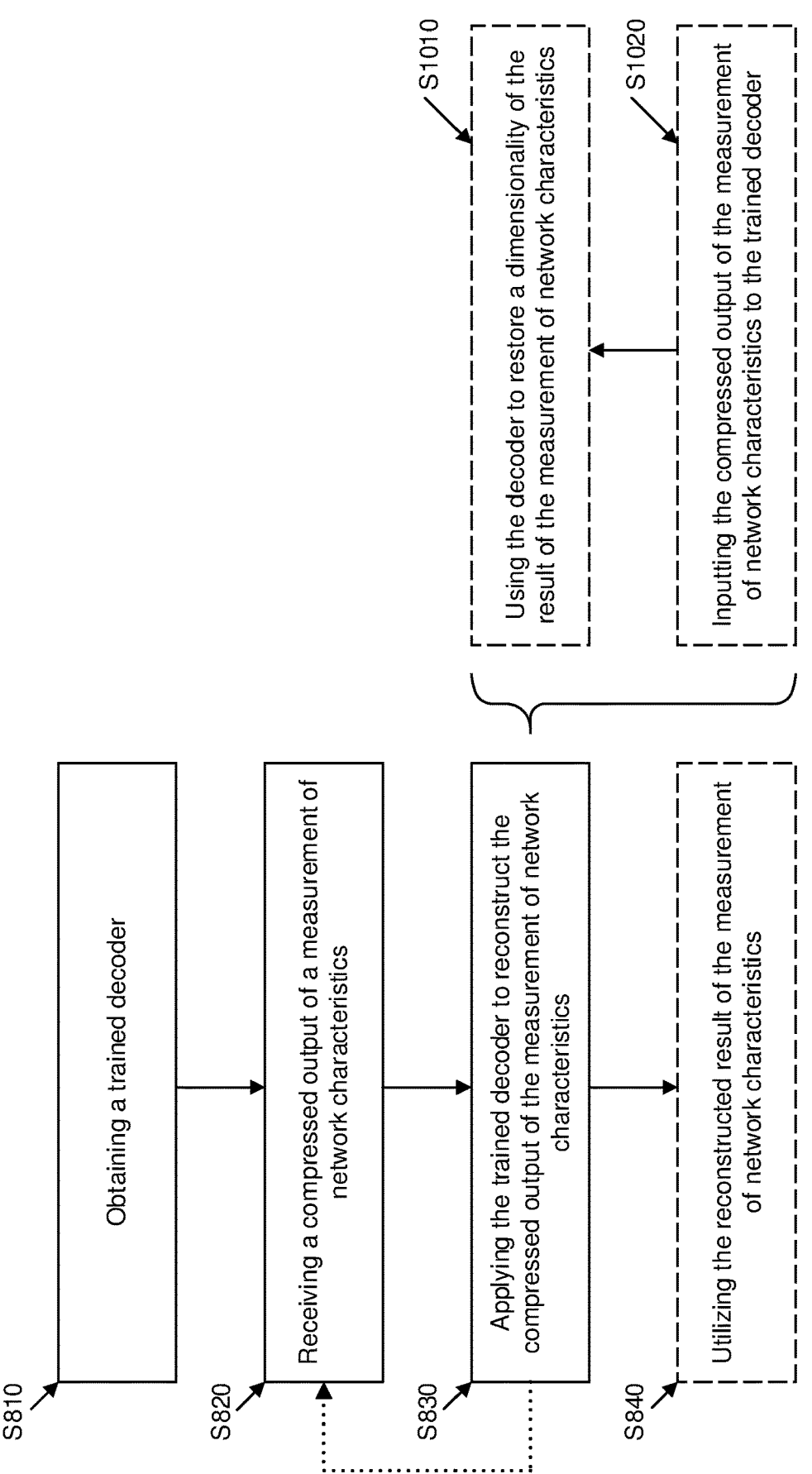

Referring now to FIG. 10, referring to embodiments of methods performed by a network entity, wherein the method step of: S830 applying the trained decoder to reconstruct the compressed representation of the measurements of network characteristics, whereby reconstructed measurements of network characteristics is generated, may be further defined as comprising the method step of:

S1010 using the decoder to restore the compressed representation of the measurements of network characteristics.

The method step of: S830 applying the trained decoder to reconstruct the compressed representation of the measurements of network characteristics, whereby reconstructed measurements of network characteristics is generated, may also be defined as comprising the method step of: S1020 inputting the compressed representation of the measurements of network characteristics to the trained decoder.

Figure 11:
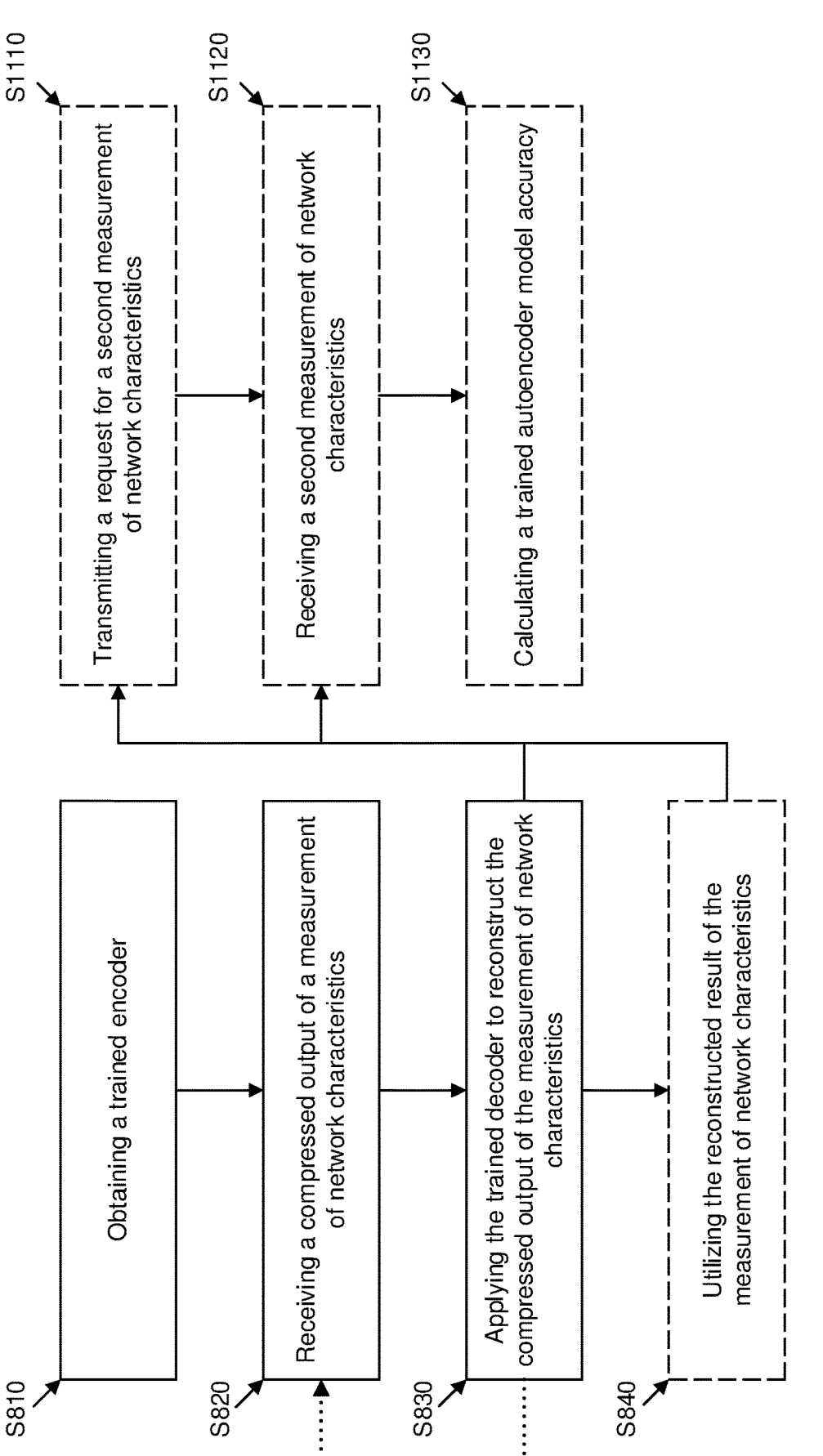

FIG. 11 discloses yet alternative embodiments, performed by a network entity, of the disclosure. According to the embodiments of FIG. 11 the method may further comprise the method step of: S1110 transmitting a request for at least a second measurements of network characteristics of the communication network, towards the wireless device. In response thereto, the wireless device may transmit a second measurement of network characteristics, whereby the network entity may perform the method step of: S1120 receiving a second measurements of network characteristics, transmitted by the wireless device, wherein the wireless device has performed the second measurements of network characteristics of the communications network, and S1130 calculating a trained autoencoder model accuracy. According to embodiments, the received second measurements are stored at the network entity, or at any other network component, wirelessly or by wireline connected to the network entity, for example at a central unit, after being received.

According to further embodiments, the second measurements of network characteristics is transmitted towards the network entity, by a wireless device, on a regular basis, i.e. the method step of: S1110 transmitting a request for at least a second measurements of network characteristics, towards the wireless device, is not required. This is indicated in FIG. 11 by that the method step of: S1110 transmitting a request for at least a second measurements of network characteristics, towards the wireless device, is bypassed. According to further embodiments, transmission by at least a second measurements of network characteristics, may be triggered by the wireless device. According to yet further embodiments the trained autoencoder model accuracy may be calculated at the wireless device. An advantage with such embodiments is that no transmission of a second measurements of network characteristics is required, since measurements of network characteristics continuously are performed by the wireless device, in accordance to configurations of the wireless device complying with current standards. However, in order to be able to calculate the model accuracy the wireless device has to be provided with the decompressed representation, or the reconstructed result, of the measurements of network characteristics, decoded at the network entity. The result of the decoded representation may be sent to the wireless device on request or periodically.

Figure 12:
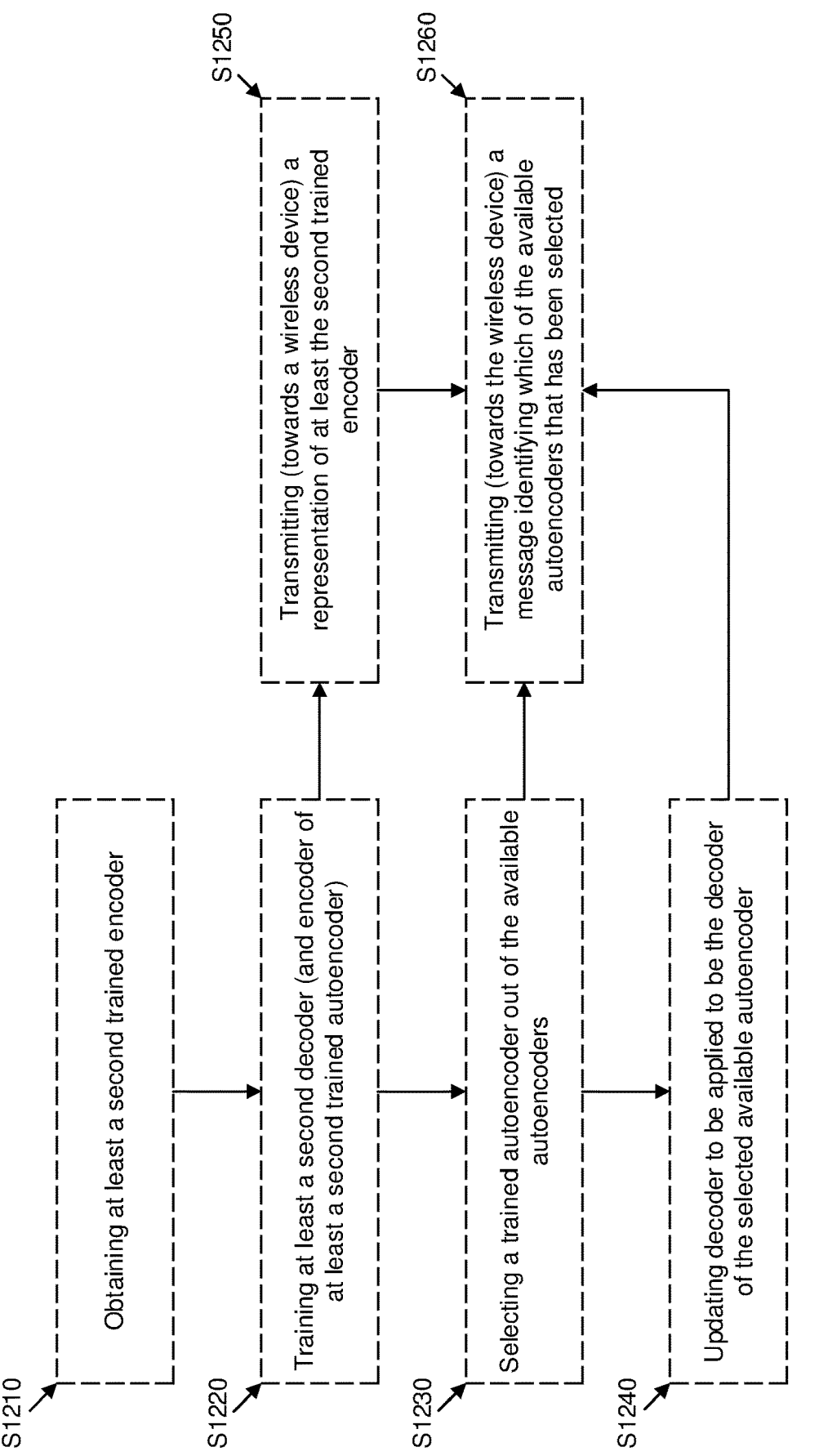

Some of the method steps disclosed in FIG. 11, and also some of the method steps disclosed in the hereafter discussed FIG. 12, are intertwined with method steps discussed in relation to FIG. 5 (which partly are the same as discussed in relation to FIG. 6). FIGS. 11 and 12 discloses methods performed by a network entity whereas FIGS. 5 and 6 discloses methods performed by a wireless device.

According to embodiments, the received second measurements of network characteristics comprises corresponding information, e.g. results of various measurements of network parameters and/or characteristics, as the previously discussed measurements of network characteristics. Irrespective of being performed at the wireless device or at the network entity, comparing measurements of network characteristics—collected and compressed by encoding at a wireless device, subsequently being transmitted as a compressed representation to a network entity, and finally being decompressed by decoding at the network entity, wherein the encoding/compression and decoding/reconstruction of the measurements of network characteristics is achieved by using a trained encoder and a trained decoder of a trained autoencoder—with a second measurements of network characteristics, which has not been encoded/decoded, thus not compressed/reconstructed, enables the performance of the autoencoder to be evaluated. If the evaluation, or comparison, is performed at the wireless device, the wireless device has to be provided with encoded/decoded measurements. If the evaluation, or comparison, is performed at the network entity, the network entity has to be provided with second measurements. Obviously, if the evaluation, or comparison, is performed at a central unit both encoded/decoded measurements and second measurements have to be provided to the central unit. According to embodiments, the performance of an autoencoder may be evaluated by calculating an autoencoder model accuracy, herein also referred to compression-reconstruction accuracy of the model.

An autoencoder, AE, model accuracy may be calculated according to a number of methods. According to an exemplary embodiment the trained autoencoder model accuracy is calculated according to: [number of network characteristics correctly reconstructed by the trained decoder] divided by [the total number of network characteristics compressed by the trained encoder], or as shown in equation (1):

$$AE \text{ model accuracy} = \frac{\begin{array}{c} \text{no. of characteristics correctly} \\ \text{reconstructed (by decoder)} \end{array}}{\begin{array}{c} \text{total no. of characteristics} \\ \text{compressed (by decoder)} \end{array}} \quad (1)$$

If a network characteristic is correctly reconstructed may for example be determined by that the reconstructed network characteristic is equal to the inputted network characteristics to a certain percentage, for example exceeding a predefined similarity percentage threshold.

As previously mentioned, aspects of the present disclosure also relate to methods for updating and/or selecting the most suitable autoencoder out of currently available autoencoders. Such embodiments are here disclosed from the perspective of the network entity. According to embodiments, updating or implementing a second autoencoder are done online, i.e. without interrupting the operation of neither wireless devices nor network entities involved.

Referring now to FIG. 12 schematically disclosing exemplary embodiments of the disclosure where there are at least two trained autoencoders to select from. According to embodiments such methods, performed by a network entity, may comprise the method step of:

S1210 obtaining at least a second trained decoder of at least a second trained autoencoder, wherein the available autoencoders are differently configured. As previously discussed, according to embodiments the currently implemented trained autoencoder and at least a second trained autoencoder obtained may be configured for example for providing different compression ratio, may have different level of complexity, which may affect computational resources required and/or time required for executing respective method, or may be configured to provide different model accuracy. As previously discussed, thereby, the selection of which autoencoder to be applied may be based on for example desired, or for the current circumstances and/or application most suitable, compression ratio, or compression-reconstruction accuracy, available computational resources, calculation time restraints etc.

According to embodiments, the method step of:

S1210 obtaining at least a second trained decoder of the at least a second trained autoencoder, wherein the available autoencoders are differently configured, comprises the method step of:

S1220 training at least the second encoder and at least the second decoder of at least the second autoencoder, by using the training data comprising measurements of network characteristics performed by a wireless device, wherein the training data has been provided to the network entity from a wireless device prior to the training. As previously discussed, the training data may have been provided by a wireless device, or a central unit, on request of the network entity.

Still referring to FIG. 12, according to embodiments of the disclosure, methods performed by a network entity may further comprise the method steps of:

S1230 selecting a trained autoencoder out of the available autoencoders, for which the decoder is to be applied, wherein which trained autoencoder that is selected is based on at least one of: a calculated autoencoder model accuracy, application of the reconstructed measurements of network characteristics, desired autoencoder compression ratio, and/or at least one network condition, wherein the at least one network condition is measurable by the network entity, or previously has been transmitted towards the network entity by a wireless device, and S1240 updating decoder to be applied to be the decoder of the selected available autoencoder.

According to embodiments, the at least one network condition is one of: SINR, RSRP, RSRQ, cell load, network congestion, number of active wireless devices fulfilling a predetermined criterion, resource utilization, channel variation and channel quality.

Training of neural networks is generally an energy consuming operation. Thus, as previously discussed, according to embodiments of the disclosure it may be advantageous to train at least a second autoencoder at the network entity, or even at a central unit, since generally energy consumption and/or computational resources restraints, are not that significant in relation to if training was performed at a wireless device. After training the trained encoder has to be provided to the wireless device. If more than one trained encoder is available at the wireless device the wireless device also needs to be informed of which of the available trained encoder that should be implemented.

Thus, according to embodiments of a method performed by a network entity the method may further comprise the method step of:

S1250 transmitting towards a wireless device a representation of at least the second trained encoder, and according to embodiments also the method step of:

S1260 transmitting towards the wireless device a message identifying which of the available autoencoders that is selected for implementation. As is obvious for the skilled person, transmitting the representation of at least a second trained encoder, and transmitting the message identifying which trained encoder that is to be applied, can be done simultaneously, or the message identifying which trained encoder that is to be applied can be included in the representation of at least the second trained encoder. In embodiments where only representation of one additional, i.e. second, trained encoder is transmitted by the network entity, or by a central unit, towards the wireless device, receiving the second trained encoder may be interpreted as an indication in itself that the second trained encoder should be applied.

However, as previously mentioned, according to not shown embodiments the at least second trained decoder may also be trained at a wireless device. For such embodiments the method step of:

obtaining at least a second trained decoder of the at least a second trained autoencoder, wherein the available autoencoders are differently configured, performed by a network entity, comprises the method step of:

receiving a representation of at least the second trained decoder, wherein at least the second trained decoder is transmitted from a network entity or a central unit, and additionally the method may comprise the method steps of:

receiving a message indicating which of the available autoencoders that should be applied, i.e. which of the available decoder that should be implemented at the network entity, wherein the message is transmitted from a wireless device or a central unit, and updating decoder to be applied to be the decoder of the indicated available autoencoder.

Figure 13:
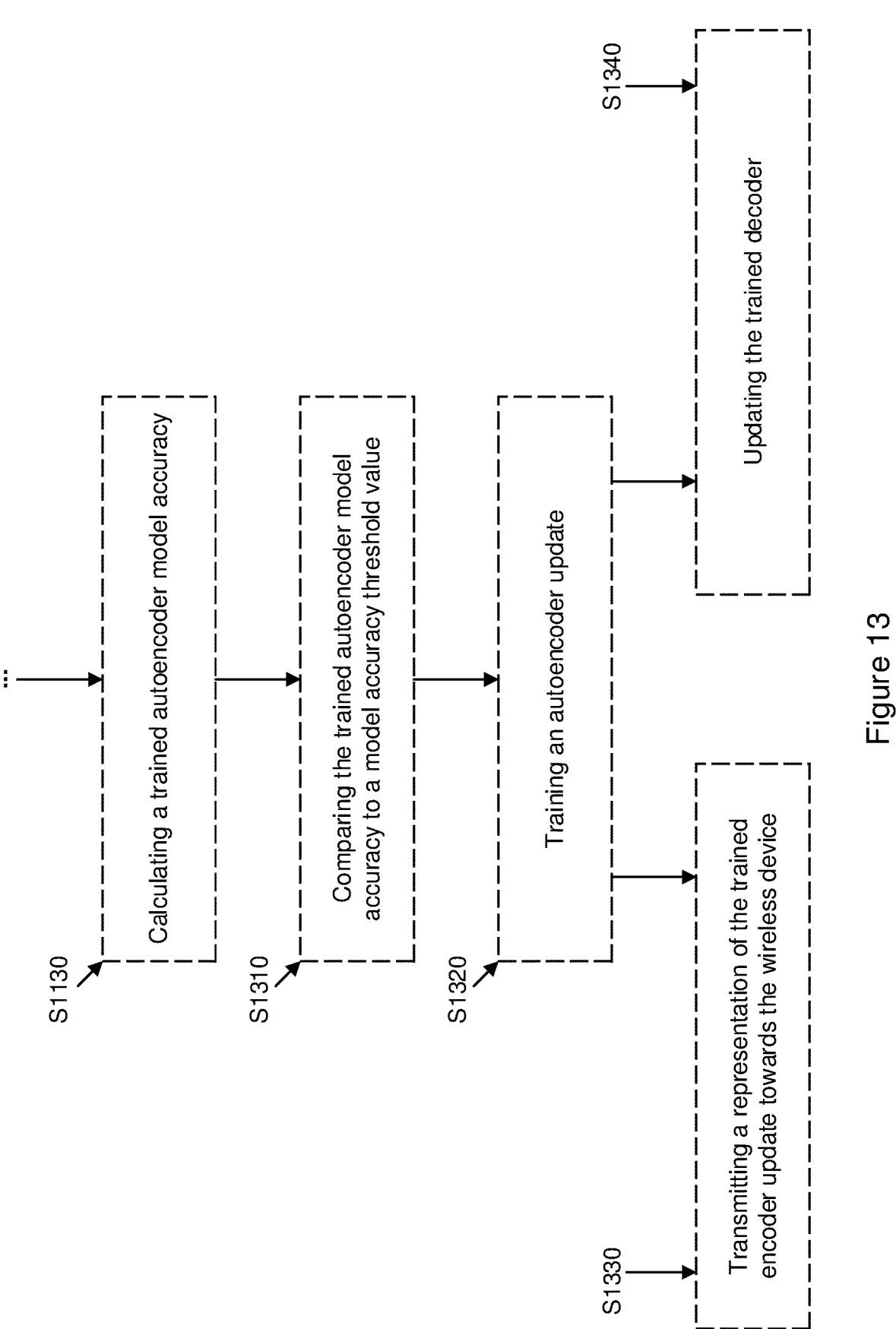

According to yet further embodiments the autoencoder currently being applied may be updated by implementation of a completely new autoencoder or by updating at least one trainable parameter and/or hyperparameter of the autoencoder currently being applied. An exemplary embodiment is schematically shown in FIG. 13. FIG. 13 discloses an exemplary embodiment of a method, performed by e network entity, preferably after performing the method step of S1130 calculating a trained autoencoder model accuracy, comprising the method step of:

S1310 comparing the trained autoencoder model accuracy to a model accuracy threshold value. According to embodiments, the trained autoencoder model accuracy threshold is a network parameter that may be set dependent on for example what the reconstructed representation of measurements of network characteristics of the communication network should be used for. The model accuracy threshold may for example be set higher if the reconstructed representation should be used for data analytics than for initiating particular communications network procedures. According to other embodiments, acceptable model accuracy, and thus the model accuracy threshold value, may be dependent on the overall network load, wherein if the network load is high the threshold may be, at least temporarily, lowered which may allow autoencoders configured for higher compression ratios to be used, or, as will be discussed below, accepting a lower autoencoder model accuracy before update of the autoencoder is triggered.

As discussed above, according to embodiments, if the trained autoencoder model accuracy is equal to and/or lower than the model accuracy threshold value, the method may further comprise the method step of:

S1320 training an autoencoder update, comprising a trained encoder update and a trained decoder update, by using training data comprising measurements of network characteristics performed by a wireless device. According to embodiments, training of the autoencoder update is performed by starting from an existing autoencoder, for example the autoencoder currently being implemented, and re-training the existing autoencoder.

Still referring to FIG. 13, according to further embodiments the method may further comprises the method step of:

S1330 transmitting a representation of the trained encoder update towards the wireless device, enabling that the wireless device may update the encoder currently being applied, and S1340 updating the trained decoder currently being applied, by the network entity, by implementing the trained decoder update. The transmitted representation of the trained encoder update may also comprise an indication of that the wireless device should implement the received trained encoder update, or such message may be sent separately from the network entity to the wireless device. Training an implementing an autoencoder update, according to embodiments based on calculating a trained autoencoder model accuracy, preferably by comparing the calculated trained autoencoder model accuracy to a model accuracy threshold, for example provides the exemplary advantage that it is possible to control the performance of the method for reducing data transmission. Further advantages are for example that by controlling the model accuracy threshold, the update frequency of the model can be controlled.

According to embodiments, the trained encoder update, and the trained decoder update, comprises at least one of: a number of layers of the trained encoder/decoder update, a number of neurons in respective layer of the trained encoder/decoder update, activation function of respective neuron of the trained encoder/decoder update, degree of connectivity between neurons of the trained encoder/decoder update, type of layer of respective layer and/or weights for connections between neurons of the trained encoder/decoder update.

According to embodiments the method steps of: comparing the trained autoencoder model accuracy to a model accuracy threshold value, and: training an autoencoder update, may be performed at the wireless device. For such embodiments the model accuracy is either calculated at the network entity and/or central unit, and transmitted towards the wireless device, or is calculated at the wireless device, as previously discussed. If the autoencoder update is trained at the wireless device the method further comprises the method step of: transmitting the trained decoder update towards the network entity.

According to embodiments, the herein discussed measurements of network characteristics comprises measurement data reflecting at least one from the non-exhaustive list of network characteristics comprising: location of the wireless device, speed of movement of the wireless device, Reference Signal Received Power, RSRP, Reference Signal Received Quality, RSRQ, Signal to Interference plus Noise Ratio, SINR, Received Signal Strength Indicator, RSSI, Subframe Time Difference, SSTD, Channel Busy Ratio, CBR, Channel occupancy Ratio, CR, Quality of Service, QoS, metrics (jitter, packet loss ratio, delay) and/or positioning of wireless device. According to another definition of the herein discussed measurements of network characteristics, the measurements of network characteristics may be considered to be at least one of the measurements defined in for example previously referred to 3GPP TS 36.214.

According to further embodiments, the measurements of network characteristics may be recorded over a time period T, wherein the time period T is a configurable parameter, which may be configured based on for example; utilization of the decoded and reconstructed representation of the measurements of network characteristics of the communication network, i.e. what the reconstructed network characteristics will be used for, computational and/or energy consumption aspects, quality of network characteristics or variation over time, and in magnitude, of the network characteristics. T can also be set in accordance to what has shown to provide desired result, based on experience and/or an iterative process, According to yet further embodiments, the measurements of network characteristics is recorded with a periodicity of p, wherein the periodicity p also is a configurable parameter, which may be configured based on for example; utilization of decoded and reconstructed representation of the measurements of network characteristics of the communication network, i.e. what the reconstructed network characteristics will be used for, computational and/or energy consumption aspects, quality of network characteristics or variation over time, and in magnitude, of the network characteristics. T can also be set in accordance to what has shown to provide desired result, based on experience and/or an iterative process, According to embodiments, irrespective of if the training of the autoencoder is done at a wireless device, a network entity or a central unit, the training of the autoencoder may be done offline, i.e. before the method is implemented in a communications network. Training the autoencoder offline provides many advantages. For example; the training can be performed during periods where the energy consumption of the device or entity at which the training is performed is low. Training off-line also facilitates control of the performance and properties of the autoencoder, for example when it comes to compression ratio, energy consumption and reconstruction error. When the autoencoder has been trained, by using training data, additional data, referred to test data, may be used to evaluate the performance, i.e. evaluate the similarity between the input data compressed during encoding and the decoded reconstructed representation. By setting a threshold value expressing a required reconstruction accuracy, it can be determined when an autoencoder is sufficiently trained to be implemented.

As previously discussed in relation to a wireless device, according to embodiments, before any of the previously defined method steps, performed by a network entity, is performed, the method comprises: receiving a default trained decoder, of a default trained autoencoder, from a central unit, and implementing the default trained decoder. Such default trained autoencoder may be trained offline.

Hereinafter, the logic behind autoencoders is schematically described. A schematic exemplary disclosure of the logic of an autoencoder is shown in FIG. 15.

Figure 14:
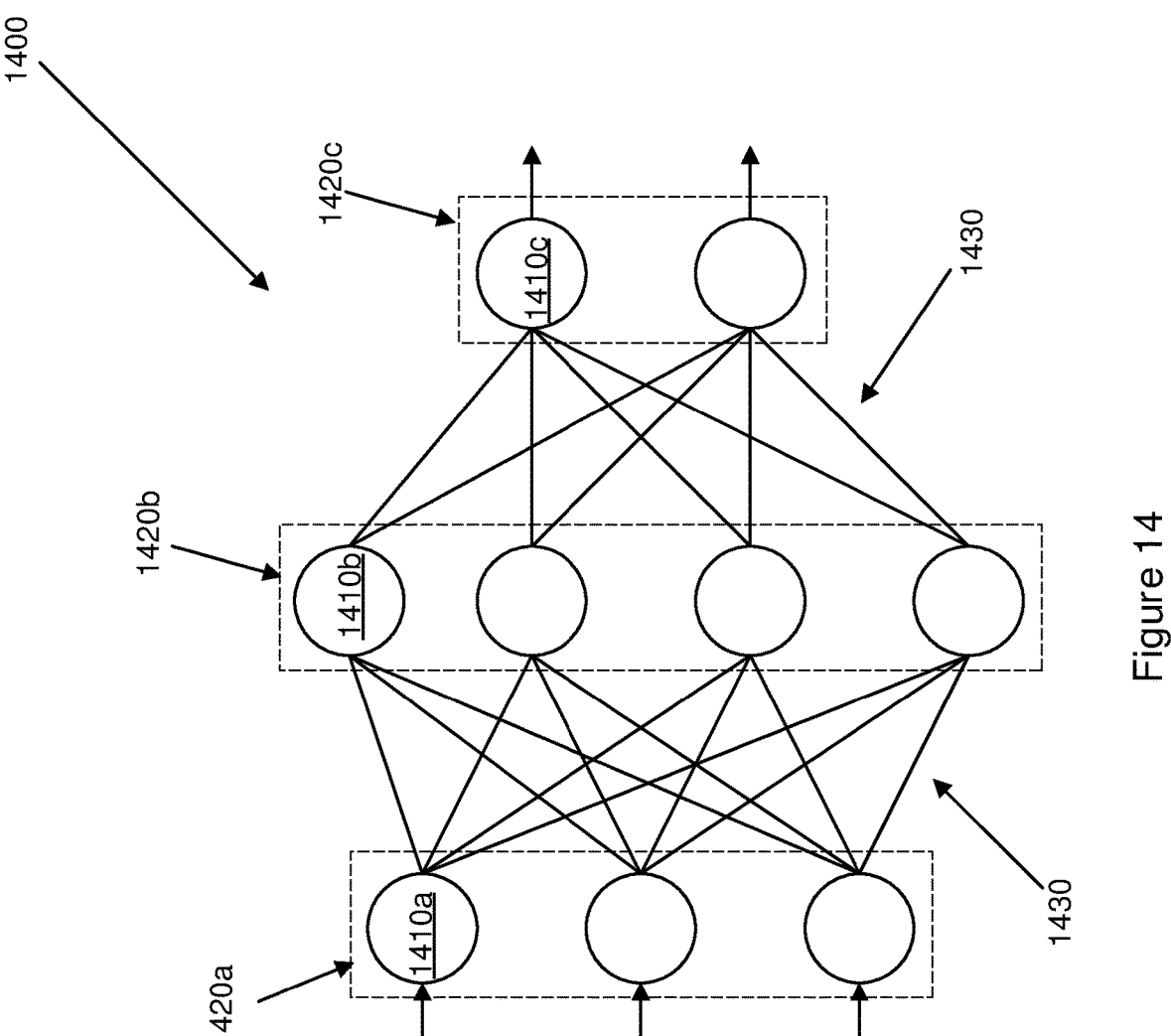
Figure 15:
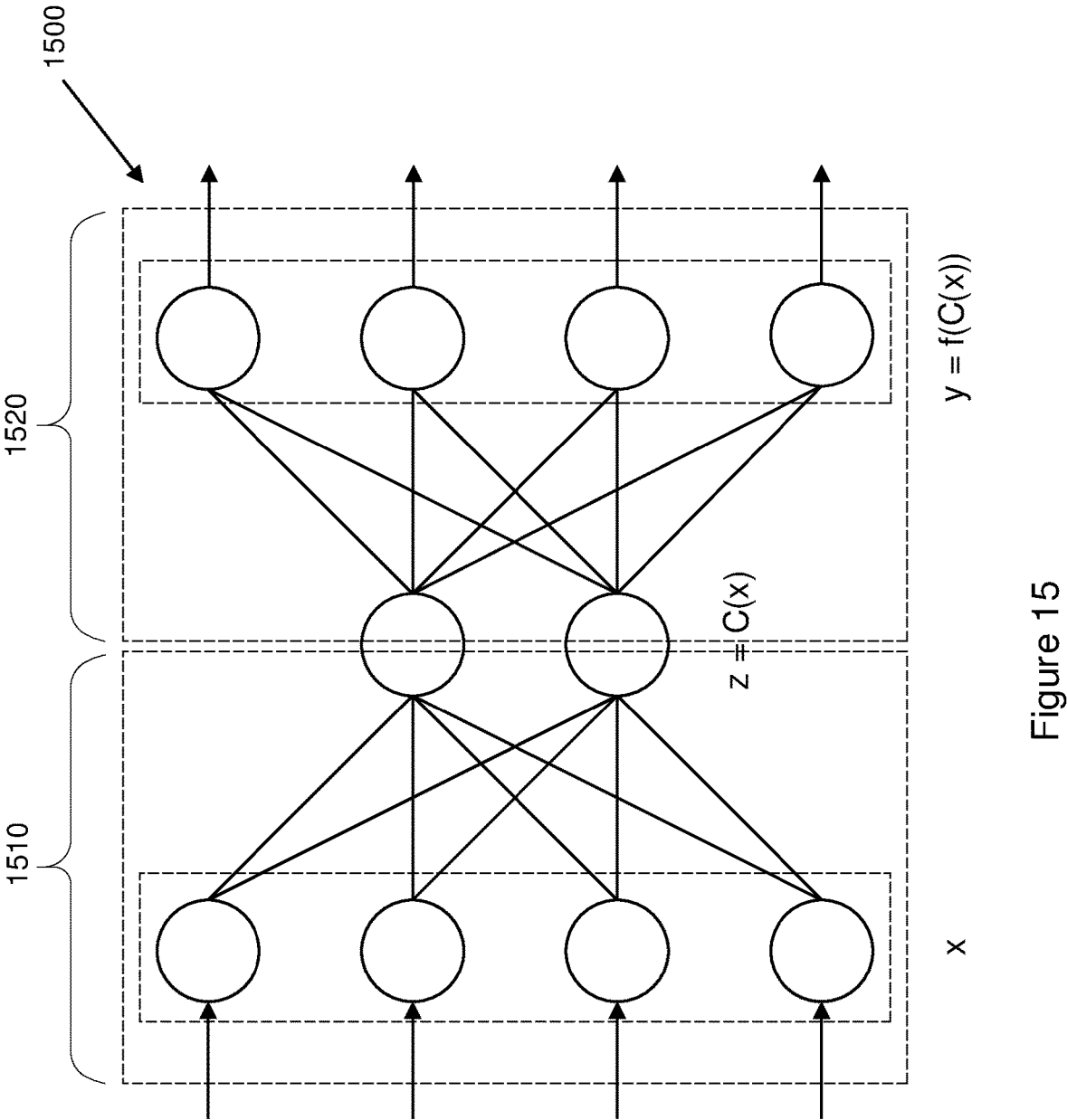

As is shown in FIG. 15, and as will be discussed below, an autoencoder 1500 comprises an encoder part 1510 and a decoder part 1520. The encoder part 1510 and decoder part 1520 may comprise, for example, Deep Neural Networks, DNNs, comprising a plurality of layers of neurons. The autoencoder of the herein discussed disclosure has been trained using training data assembled from what herein generally is referred to as measurements of network characteristics, and which for example may be communication channel measurements performed by at least one wireless device located in a communications network. Below, the logic behind neural networks will also be schematically described. A schematic exemplary disclosure of the logic of a neural network shown in FIG. 14.

Referring to FIG. 14, a Neural Network, NN, 1400 is a type of supervised Machine Learning, ML, model that can be trained to predict a desired output by using given input data. A neural network 1400 may generally be described as a network, designed to resemble the architecture of the human brain, formed by a number of connected neurons 1410 (1410a, 1410b, 1410c), or nodes, in multiple layers 1420 (1420a, 1420b, 1420c). A neural network 1300 generally comprises a number of input neurons 1410a of an input layer 1420a, a number of hidden layers 1420b, each comprising a number of neurons 1420b, and finally an output layer 1420c, comprising at least one output neuron 1410c. In the exemplary embodiment shown in FIG. 14 the neural network 1400 comprises two output nodes 1410c, which for example is used for neural networks configured for binary classification. Hidden layers 1420b are referred to as hidden layers because their inputs and outputs are masked by an activation function of that layer. Each neuron 1410b of a hidden layer 1420b is connected to a number of neurons 1410a of preceding layer 1420a, i.e. neurons of the most recent higher layer, and a number of neurons 1410c in a directly subsequent layer 1420c, i.e. the following lower layer. The more hidden layers, the deeper the neural network. The NN 1400 of FIG. 14 is a NN with two layers, i.e. N=2. As will be discussed below, neural networks of auto-encoders are often referred to as being Deep Neural Networks, DNNs, i.e. comprising a relatively large number of hidden layers.

When a neural network 1400 is activated input provided to the input layer 1420a travels from the input layer 1420a, to the output layer 1420c, possibly after passing the hidden layers 1420b multiple times.

At least some hidden neurons 1410b represents a mathematical operation that is applied to the input data provided to respective neuron 1410b. Neurons 1410 of layers 1420 may be either fully connected, i.e. connected to all neurons 1410 of higher and lower layers 1420, as is shown in FIG. 14, or connected to just a few of the neurons of a higher and/or lower layer 1420. Generally, the output of each neuron is computed by summing up the input to that neuron provided by all connected neurons of the preceding, most recent higher, layer, and by performing a linear or non-linear function, referred to as activation function, of the sum of the inputs. Different layers and different neurons may perform different transformations on their inputs, i.e. have different activation functions. Commonly used activation functions are for example: Sigmoid function, Tanh function, Rectify Linear Unit function, ReLU, or Leaky ReLU function. The connections connecting the neurons 1410 are sometimes referred to as edges 1430, and edges 1430 are typically associated with a weight that continuously is adjusted or updated during training of the neural network 1400, thus as the neural network learns.

Neural networks are defined by hyperparameters and by trainable parameters. Hyperparameters are parameters used to tune the properties of the neural network and are set when designing the neural network, and may for example be: number of layers, number of neurons in respective layer, the activation function of respective neuron, the time interval for data processing, number of epochs, i.e. number of times the training data set is passed through the neural network, time interval for data processing or degree of connectivity between neurons. Trainable parameters are for example the weights of the neurons or biases. Each neuron of a neural network may have its own bias term, and as mentioned, the bias term is trained in the same way as weights, thus for example by applying Stochastical Gradient Descent, as will be further discussed below. A bias can be seen as a threshold value determining if a neuron should be activated or not, thus if the activation function output of a neuron is going to be propagated forward through the neural network or not. When a Neural network is set up the weights and biases need to be assigned an initial value. According to embodiments, biases may be initialized with zeroes, and weights may be initialized with random numbers.

On a high level, neural networks are trained by providing training data comprising example input data and the corresponding "correct" outcome, generally also referred to as ground truth. The training data is iterated through the neural network (each iteration referred to as epoch) and for each piece of training data, the weights associated with respective neuron is adjusted at each iteration until the optimal weightings are found that produce predictions for the training examples that reflect the corresponding ground truths. Generally, for a given data set, part of the data is used for training the neural network, referred to as training data, and part of the data is used for validating the performance of the neural network, referred to as validation or test data. When adjusting a weight, the weight is either increased or decreased in strength, meaning that how probable it is that a specific edge, or connection, out of the many possible, from a neuron, that is selected when a neuron is reached, is adjusted. Generally, for each training iteration of the neural network the probability that the predicted outcome is correct increases. The training is generally performed using one of many known methods, such as for example by using any suitable form of Gradient Descent, GD. GD is an optimization model suitable for finding local minima of differentiable functions, thus performing a minimization calculation. On form of GD, previously mentioned, is Stochastical Gradient Descent. Generally, the GD model performs the minimization calculation by first calculating the gradient of the loss function and then updating at least the weights of the neural network in accordance thereto. To calculate the gradient GD uses backpropagation.

Referring now to FIG. 15, schematically disclosing an exemplary embodiment of an autoencoder 1f00. Autoencoders are generally used to denoise images. An autoencoder 1f00, AE, is a type of Machine Learning, ML model, more particularly, an AE may be defined as a dimension-reduction ML model, or a ML model capable of compressing data. As known, all compression is related to some kind of information loss. The general idea of autoencoders consist of setting an encoder part and a decoder part as neural networks and set the neural networks to learn the best possible encoding-decoding scheme, thus best possible compression-reconstruction operation, using an iterative optimization process.

Autoencoders are trained to take a set of input features, x, and reduce the dimensionality of the input features, with minimal information loss. An autoencoder takes an input vector of the input features x and transforms it into a latent representation z, where z is the compressed vector of x, and may be expressed in a general way by equation (2)

$$z = C(x) \tag{2}$$

where C represents a function used to compress the input vector, x.

The compression of the input vector, also referred to as transformation, is performed by what generally is referred to as an encoder 1510, or an encoder part, of the autoencoder 1500. The resulting compressed, latent representation z is subsequently mapped back into the reconstructed feature space y by means of what generally is referred to as the decoder 1520, or the decoder part, of the autoencoder 1500. The reconstructed output features, y, may be expressed in a general way by equation (3):

$$y = f(C(x)) \tag{3}$$

where f represents a function used to reconstruct the compressed latent, representation z.

According to one exemplary embodiment of an autoencoder; measurement of network characteristics can be used as input data, or input features x, the encoded representation of measurement of network characteristics is the latent representation z, and the decoded, reconstructed network of network characteristics is the reconstructed output features y.

Autoencoders are for example discussed in "Learning deep architectures for AI", Bengio, Y., Technical report 1312, 2007, Dept. IRP, Université de Montréal, wherein it is disclosed that the encoder part may be defined by equation (4):

$$z=\sigma(Wx+b) \tag{4}$$

where W and b correspond to the weights and bias of the encoder, and a is function, preferably non-linear function. Generally, a is often used to represent a Sigmoid function, but there are also other functions, such as for example Tanh, Rectify Linear Unit function, ReLU, or Leaky ReLU function which may be used depending on the implementation. According to the example the decoder may be defined by equation (5):

$$y=\sigma(W'z+b') \tag{5}$$

where W' and b' correspond to the weights and bias in the decoder.

The autoencoder 1500 is trained by minimizing the reconstruction error ‖y−x‖. This may also be expressed as that the encoder 1510 and decoder 1520 parts of the autoencoder 1500 are trained with the goal of keeping as much information as possible during the compression-reconstruction of the input data, thus x should be as close to y as possible. For an autoencoder 1500 the loss function may be seen as a function/value describing how close the reconstructed output is to the input. The better resemblance, the lower loss. The encoder 1510 and decoder 1520 parts may comprise, for example, deep neural networks as discussed above.

Training of an autoencoder 1500 is generally an unsupervised process and comprises reducing a loss function describing the difference between the unencoded input data and decoded output data. The loss function may for example be a Mean Squared Error, MSE, loss function, Root Mean Squared Error, RMS, Mean Absolute Error, MEA, Percentage RMS Difference, PRD, for the linear regression problem.

According to the present disclosure, the encoder part 1510 and a decoder part 1520 of the autoencoder 1500 may be trained by using training data assembled from communication channel measurements performed by at least one wireless device, what herein generally is referred to as measurements of network characteristics. One example of a method that may be used by an autoencoder for reducing the dimensionality of the input data is Principal Component Analysis, PCA.

As mentioned, an exemplary embodiment of an autoencoder 130, comprising an encoder part 140 and a decoder part 150, configured for executing a method of the present disclosure, is schematically disclosed in FIG. 1.

According to embodiments of the present disclosure, the disclosure also relates to aspects of a computer implemented method for training an autoencoder. Such method is schematically shown in FIG. 16. The autoencoder comprises an encoder, also referred to as encoder part, and a decoder, also referred to as decoder part, and wherein the autoencoder is applied for reducing data transmissions in a communications network, performed by a computer device, wherein the method comprises the method steps of:

S1610 obtaining training data comprising measurements of network characteristics, performed by a wireless device, S1620 using the obtained training data to train the encoder and decoder of the autoencoder, whereby the encoder is trained to compress, or encode, the measurements of network characteristics to generate a compressed representation of measurements of network characteristics, and the decoder is trained to reconstruct, or decode, the compressed representation of measurements of network characteristics, whereby a trained encoder and trained decoder is obtained. According to embodiments, before the training data comprising measurements of network characteristics, wherein the measurements are performed by a wireless device of a communications network, is used to train the encoder and decoder of the autoencoder, the method comprises the method step of: representing the measurements of network characteristics of the communications network as at least one vector. According to embodiments, the representation may for example comprise measurement results ordered in a matrix, comprising a number of vectors. According to embodiments the training is performed off-line.

According to embodiments, the computer device performing the training may be one of: a wireless device, a network entity or a central unit. Training the autoencoder in a wireless device has the advantage that measurements of network characteristics is available at the wireless device anyway, thus no additional transmission of measurements of network characteristics from the wireless device is required, but a wireless device may be less suitable for performing training due to energy consumption and/or memory availability requirements. If the autoencoder is trained at a wireless device the trained decoder has to be transmitted towards the network entity. From an energy consumption, and/or memory availability, perspective it may be advantageous to train the neural network at a network entity, such as for example a gNodeB, or at a central unit. If trained at a network entity the trained encoder of the autoencoder has to be transmitted towards the wireless device, and if trained at a central unit the trained encoder has to be transmitted towards a wireless device and the trained decoder has to be transmitted towards a network entity.

According to embodiments, the method step of: S1620 using the obtained training data to train the encoder and decoder of the autoencoder, corresponds to method step S410 training an encoder and a decoder of an autoencoder, when the method of FIG. 16 is performed by a wireless device, and corresponds to method step S910 training an encoder and a decoder of an autoencoder, when the method of FIG. 16 is performed by a network entity.

Thus, according to embodiments, the method step of:

S1610 obtaining training data comprising measurements of network characteristics performed by a wireless device of a communications network, may comprise the method step of:

S1630 receiving measurements of network characteristics performed by a wireless device, to be used as training data. According to embodiments, the measurements of network characteristics may for example be transmitted from a wireless device of the communications network, or from a central unit.

According to further embodiments, the method steps of:

S1620 using the obtained training data to train the encoder and decoder of the autoencoder, can be divided into a number of sub-method steps. Still referring to FIG. 16, according to embodiments the training step may comprise the method steps of:

S1640 configuring the autoencoder according to at least one hyperparameter,

S1650 inputting the obtained training data to the encoder to generate a compressed representation of the training data, S1660 inputting the compressed representation of the training data to the decoder to generate reconstructed training data, S1670 calculating a loss function expressing the reconstruction error between the training data before being inputted to the encoder and after being reconstructed by the decoder, and S1680 minimizing the loss function, expressing the reconstruction error, by optimizing trainable parameters of the autoencoder.

According to embodiments, the loss function expressing the reconstruction error may be is calculated by applying one of the loss functions from a non-exhaustive list of loss functions comprising: Mean Square Error, MSE, or Sparse Categorial Cross-entropy, SCC. According to embodiments, minimizing the loss function, expressing the reconstruction error, may be performed by applying a Gradient Descent, GD, model, for example a Stochastical Gradient Descent, SGD, model.

According to further embodiments, the at least one hyperparameter configuring the autoencoder is at least one from a non-exhaustive list of hyperparameters comprising: learning rate, number of EPOCs, batch size, number of training samples in the training data, number of validation samples in the training data, the time interval for data processing, number of neurons of respective layer and/or number of layers.

According to embodiments of the present disclosure, the trainable parameters of the autoencoder, that are updated during training, is at least one of: weights and/or biases.

According to embodiments, the central unit may be a distributed system. According to further embodiments the distributed system may be a cloud system, thus a system capable of performing operations such as collecting data, processing data and outputting data, located in a cloud. According to another embodiment the central unit may be a type of relay node.

Figure 17:
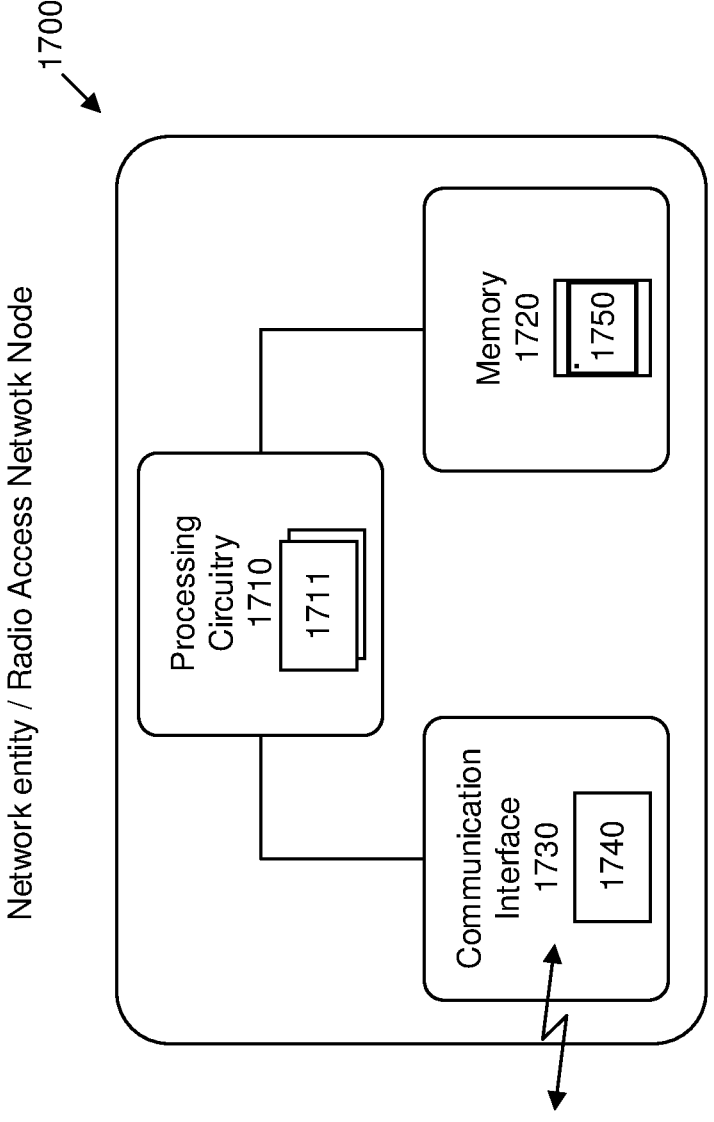
FIG. 17 shows a block diagram schematically illustrating an exemplary embodiment of a network entity.

FIG. 17 shows a block diagram schematically illustrating an exemplary embodiment of a network entity 1700 according to the disclosure. In some embodiments the non-limiting term network node is used instead of, and may be used interchangeably with, network entity. The network entity 1700 may be arranged to be operatively connected to a plurality of other network nodes and/or entities of a communications network.

Herein, network entity 1700 is used as a non-limiting term for any type of physical (or virtual) network node that serves a wireless device and/or is connected to other network entities or network elements of a communications network, thus that is configured for receiving a signal from, and/or transmitting a signal towards, a wireless device or another network entity. The skilled person would know that what is considered with network entity may also be referred to as radio network node, network node or Radio Access Network node, RAN node, and that an example of a network entity may for example be, but are not limited to be, a/an; NodeB, Base Station, BS, Multi-Standard Radio node, MSR node, evolved NodeB, eNodeB, Next generation NodeB, gNodeB, network controller, Radio Network Controller, RNC, Base Station Controller, BSC, relay, donor node controlling relay, Base Transceiver Station, BTS, or Access Point, AP. Also, future developments of network entities, as defined herein, are considered to be within the scope of the term network entity.

Still referring to FIG. 17, according to embodiments the network entity 1700 may comprise a processing circuitry 1710 which is capable of executing or implementing any one embodiment of a method performed by a network entity, or any combination of embodiments of method performed by a network entity, disclosed herein, for example on receipt of suitable computer-executable instructions from a computer program 1750. Exemplary embodiments of methods executed may for example be the embodiments of methods disclosed in any one of FIGS. 8 to 13 or FIG. 16. The processing circuitry may comprise one or more processors 1711, capable of executing operations generally executed by computer devices, such as for example calculations. Embodiments of processing circuitry 1710 comprising just one processor 1711 may simply be referred to as processor.

The network entity 1700 may, in addition to the processing circuitry 1710, comprise a storage, generally referred to as memory 1720, capable of storing instructions, which when executed cause the processing circuitry 1710 to perform some or all of the method steps according to the exemplary embodiments of methods performed by network entities described herein. A memory 1720 may include one or several types of memory suitable for the processing circuitry 1710, such as for example; a Read-Only Memory, ROM, a Random-Access Memory, RAM, a cache memory, a flash memory devices, an optical storage devices, a solid state disk, a hard disk drive or similar. The instructions stored by the memory 1720 may also include instructions for executing one or more telecommunications and/or data communications protocols. The instructions may be stored in the form of the computer program 1750. The network entity 1700 may further comprise a communication interface 1730 configured to enable communication, i.e. transmission and/or reception of signals, preferably wirelessly, with external entities, such as for example a wireless device or other network entities of the communications network, and/or entities in other wireless communications networks. As shown in FIG. 17, according to embodiments the communication interface 1730 may comprise a transceiver 1740, adapted to receive messages, data, information or signals from other communications network entities and transmit messages, data, information or signals towards other communication network entities. As is obvious for the skilled person, instead of a transceiver 1740 the same functionality is obtained by having separate receivers and transmitters, comprising analogue and/or digital components and a suitable number of ports for wired or wireless communication. The processing circuitry 1710 may be connected to the memory 1720, enabling the processing circuitry 1730 to provide information and instructions to, or retrieve information and instructions from, the memory 1720, and to the communication interface 1730, enabling the processing circuitry 1710 to transmit information and instructions, or receive information and instructions, via the communication interface 1730. The computer program 1750, in turn comprising the computer-executable instructions, may enable the network entity 1700 to perform the method steps of any embodiment of methods of the disclosure. The instructions, also referred to as program code means may be loaded in a memory 1720 from another storage medium, such as a read-only memory, ROM, or other non-volatile memory, such as flash memory, or from another device via a suitable data interface.

The one or more processors 1711, which may be embodied as a single physical unit or a plurality of connected and interacting physical units, may include any suitable combination of hardware and software implemented and/or integrated in one or more modules to execute computer-executable instructions and/or process data to perform some or all of the described functions of a network entity 1700. In some embodiments, the one or more processors 1711 may include for example one or more Central Processing Units, CPUs, one or more Application Specific Integrated Circuits, ASICs, one or more Field Programmable Gate Arrays, FPGAs, and/or one or more other logic or application. In some examples, the processor or processing circuitry 1710 may include one or more microprocessors or microcontrollers, as well as other digital hardware, which may include Digital Signal Processors, DSPs, special-purpose digital logic, or similar. In certain embodiments, the one or more processors 1710 may comprise one or more modules implemented in or by software. Both the processors 1711 and/or transceiver 1740 may comprise local memories for storing information. As is apparent for the skilled person, in addition to the herein particularly defined embodiments of components and/or functionalities that a network entity may comprise, a network entity may comprise various additional components and/or functionalities. Thus, it will be appreciated that the network entity 1700 may comprise other components in addition or alternatively to those indicated in FIG. 17.

As mentioned, the network entity 1700 may be configured or be operative to perform any of the methods or functions described herein as being performed by a network entity 1700, such as any of the embodiments of the methods of FIGS. 8 to 13 or FIG. 16. It will be appreciated that the network entity 1700 may comprise, or be implemented as, one or more virtual machines running different software and/or processes. Thus, according to embodiments, the network entity 1700 may therefore comprise, or additionally comprise, one or more servers, switches and/or storage devices and/or may comprise cloud computing infrastructure or infrastructure configured to perform in a distributed manner, that runs the software and/or processes.

Figure 18:
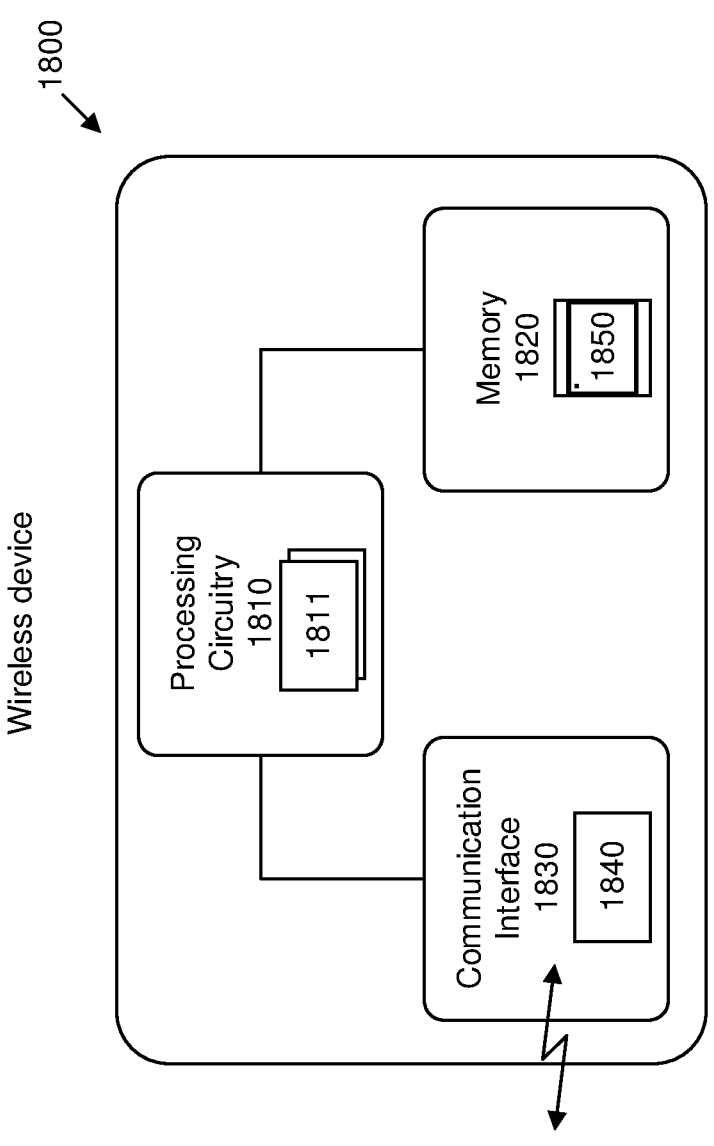
FIG. 18 shows a block diagram schematically illustrating an exemplary embodiment of a wireless device, and FIG. 19 schematically discloses an embodiment of a computer program product.

FIG. 18 shows a block diagram schematically illustrating an exemplary embodiment of a wireless device 1800 according to the disclosure. A wireless device may comprise a device capable, configured, arranged and/or operable to communicate wirelessly with, or via, network nodes and/or other wireless devices.

In some embodiments the non-limiting term User Equipment, UE, is used instead of, and may be used interchangeably with, wireless device. The term refers to any type of wireless device that may communicate with for example a network entity, such as a Radio Access Network node, RAN node, in a cellular or mobile communications network. Examples of a UE include, but are not limited to, a smart phone, a mobile phone, a cell phone, a voice over IP, VoIP, phone, a wireless local loop phone, a desktop computer, a Personal Digital Assistant, PDA, a wireless camera, a gaming console or device, a music storage device, a playback appliance, a wearable terminal device, a wireless endpoint, a mobile station, a tablet, a laptop, a Laptop-Embedded Equipment, LEE, a Laptop-Mounted Equipment, LME, a smart device, a wireless Customer-Premise Equipment, CPE, a vehicle-mounted wireless terminal device, an industry machine, an industrial robot, a home appliance or any other connected device. A UE may support Device-to-Device, D2D, communication, for example by implementing a 3GPP standard for sidelink communication, Vehicle-to-Vehicle, V2V, Vehicle-to-Infrastructure, V2I, or Vehicle-to-everything, V2X, communication. As yet another specific example, in an Internet of Things, IoT, scenario, a wireless device/UE may represent a machine or other device that performs monitoring and/or measurements and transmits the results of such monitoring and/or measurements to another wireless device/UE and/or a network entity. The UE may in this case be a Machine-to-Machine, M2M, device, which may in a 3GPP context be referred to as an MTC device. As one particular example, the UE may be a UE implementing the 3GPP narrow band internet of things, NB-IoT, standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a UE may represent a vehicle or other equipment that is capable of monitoring and/or reporting on its operational status or other functions associated with its operation. In yet another example, a UE may comprise an aerial vehicle, or drone. A UE as described above may represent the endpoint of a wireless connection, in which case the device may be referred to as a wireless terminal. Furthermore, a UE as described above may be mobile phone, in which case it may also be referred to as a mobile device or a mobile terminal. In some embodiments, a UE may be configured to transmit and/or receive information without direct human interaction. For instance, a UE may be designed to transmit information to a network on a predetermined schedule, when triggered by an internal or external event, or in response to requests from the network. Also, future developments of wireless devices, as defined herein, are considered to be within the scope of the term wireless device.

Thus, according to embodiments, the wireless device may be any one device, from a non-exhaustive list of devices, comprising: is a cellular mobile phone, a laptop, a wearable, connected device, a connected vehicle, an Unmanned Autonomous Vehicle, UAV, a connected IoT device, a connected measurement arrangement, an connected industrial machine, a connected robot, a connected home appliance, or any other device connected to the communications network.

The embodiment of a wireless device 1800 shown in FIG. 18 comprises a processing circuitry 1810, which may be a processing circuitry 1810 similar to the exemplary processing circuitry 1710 defined for the network node of FIG. 17, a communication interface 1830, which for example may be a communication interface 1730 similar to the exemplary communication interface as defined for the network entity 1710 of FIG. 17, and a memory 1820, which for example may be a memory similar to the memory 1720 defined for the exemplary network entity 1710 of FIG. 17.

The processing circuitry 1810 may comprise at least one processor 1811, suitably adapted to perform any one of the embodiments of methods disclosed in FIGS. 2 to 7 or FIG. 16. The memory 1820 may for example comprise a computer program 1850 comprising stored instructions for carrying out the method steps of any one of the embodiments of methods disclosed in FIGS. 2 to 7 or FIG. 16. The wireless device 1800 may communicate via the communication interface 1830, configured to enable communication, i.e. transmission and/or reception of signals, with external entities, such as for example a network entity. The communication interface 1830 may comprise a transceiver 1840, adapted to receive messages, data, information or signals. It will be appreciated that the wireless device 1800 may comprise other components in addition or alternatively to those indicated in FIG. 18. The processing circuitry 1810 may be connected to the memory 1820, enabling the processing circuitry 1830 to provide information and instructions to, or retrieve information and instructions from, the memory 1820, and to the communication interface 1830, enabling the processing circuitry 1810 to transmit information and instructions, or receive information and instructions, via the communication interface 1830.

For further clarification, it is noted that the features of the methods described herein, may be implemented in software and carried out on a data processing device or other processing means, thus what herein generally is referred to as processing circuitry, caused by the execution of program code such as computer-executable instructions. Thus, herein, the term processing circuitry comprises any circuit and/or device suitably adapted to perform herein discussed functions and/or methods. As previously discussed, processing circuitry may comprise general—or special-purpose programmable microprocessors, Digital Signal Processors, DSPs, Application Specific Integrated Circuits, ASICs, Programmable Logic Arrays, PLAs, Field Programmable Gate Arrays, FPGAs, special purpose electronic circuits, etc., or a combination thereof.

Alternatively, systems, apparatuses, devices and entities disclosed herein may be instantiated in a cloud computing environment as a virtual entity or node, wherein the cloud environment may comprise shared hardware resources comprising at least computing devices, memory devices and network devices. Thus, the methods discussed herein may alternatively be implemented by means of a system based on network functions virtualization.

Figure 19:
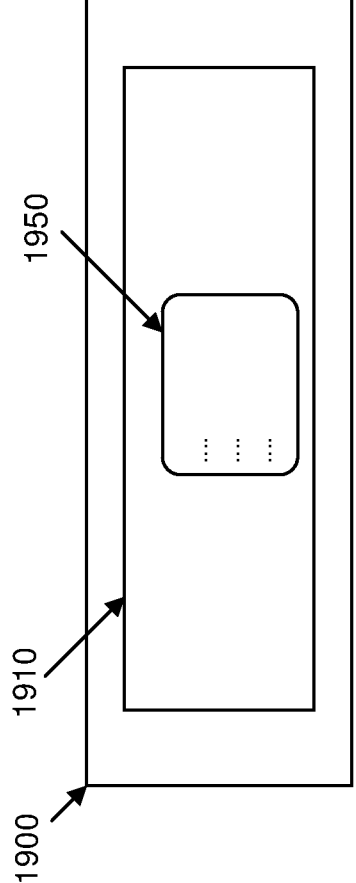

Finally, the present disclosure also relates to a computer program product 1900, as schematically disclosed in FIG. 19, comprising a computer readable medium 1910 carrying a computer program 1950, such as for example any of the computer programs 1750 or 1850 previously discussed, comprising computer executable instructions, the computer executable instructions being configured such that, on execution by a computer device, processing circuitry and/or processor, the computer device, processing circuitry and/or processor performs any one of, or a combination of, the methods disclosed herein.

The terminology used herein is for describing aspects of the disclosure only and is not intended to limit embodiments of the disclosure. As used herein, the singular forms "a", "an" and "the" are intended to include the plural forms as well, unless the context clearly indicates otherwise.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Herein, embodiments are generally described in relation to New Radio, NR. The embodiments may also be applicable to any Radio Access Technology, RAT, or multi-RAT system where the wireless device operates using multiple carriers e.g. LTE FDD/TDD, GSM/GERAN, Wi Fi, WLAN, WiMax, CDMA2000 etc. Generally, the above discussed entities are adapted to communicate over known external telecom interfaces or via application programming interfaces, API, as appropriate. Further, when herein referring to signal what is considered is generally a radio wave carrying any form of data or information.

Numbered list of exemplary embodiments of the disclosure:

1. A computer implemented method for reducing data transmission in a communications network by compression of measurements of network characteristics of the communications network, performed by a wireless device, wherein the wireless device is operable to transmit and receive signals over the communications network, comprising the method steps of:

obtaining a trained encoder, of a trained autoencoder, performing a measurements of network characteristics, applying the trained encoder to compress the measurements of network characteristics, whereby a compressed representation of the measurements of network characteristics is generated, and transmitting the compressed representation of measurements of network characteristics towards a network entity.

2. A method according to embodiment 1, wherein the method steps of:

performing a measurements of network characteristics, applying the trained encoder to compress the measurements of network characteristics, whereby a compressed representation of the measurements of network characteristics is generated, and transmitting the compressed representation of measurements of network characteristics towards a network entity, are repeated when measuring of network characteristics is triggered.

3. A method according to embodiment 1 or 2, wherein before the trained encoder is applied, the method comprises the method step of:

representing the measurements of network characteristics as at least one vector, whereby it is the at least one vector, comprising the measurements of network characteristics, that the trained encoder is applied to compress.

4. A method according to any one of embodiments 1 to 3, wherein the measurements of network characteristics comprise time-series data of one or more network characteristics, of one or more network cells, of the communications network.

5. A method according to any one of embodiments 1 to 4, wherein the encoder of the autoencoder has been trained together with a decoder of the same, autoencoder, and wherein the encoder and the decoder have been trained using training data comprising measurements of network characteristics, performed by a wireless device.

6. A method according to any one of embodiments 1 to 5, wherein the method step of:

obtaining a trained encoder of a trained autoencoder, comprises the method step of:

training an encoder and a decoder of an autoencoder, by using the training data comprising measurements of network characteristics performed by a wireless device.

7. A method according to embodiment 6, wherein the method further comprises the step of:

transmitting a representation of the trained decoder of the trained autoencoder towards a network entity and/or a central unit.

8. A method according to any one of embodiments 1 to 5, wherein the method step of:

obtaining a trained encoder of a trained autoencoder, comprises the method step of:

receiving a representation of the trained encoder, wherein the trained encoder is transmitted from a network entity or a central unit.

9. A method according to any one of embodiments 1 to 8, wherein the method step of:

obtaining a trained encoder of a trained autoencoder, comprises obtaining at least one of:

a number of layers of the trained encoder, a number of neurons in respective layer of the trained encoder, activation function of respective neuron of the trained encoder, degree of connectivity between neurons of the trained encoder, type of layer of respective layer, and/or weights for connections between neurons of the trained encoder.

10. A method according to any one of embodiments 1 to 9, wherein the method step of:

applying the trained encoder to compress the measurements of network characteristics, whereby a compressed representation of measurements of network characteristics is generated, comprises the method step of:

using the encoder to generate a compressed representation of the measurements of network characteristics.

11. A method according to any one of embodiments 1 to 10, wherein the method step of:

applying the trained encoder to compress the measurements of network characteristics, whereby a compressed representation of measurements of network characteristics is generated, comprises the method step of:

inputting the measurements of network characteristics to the trained encoder.

12. A method according to any one of embodiments 1 to 11, wherein method further comprises the method step of:

receiving a request for collecting and transmitting a second measurements of network characteristics of the communication network, wherein the request is transmitted from a network entity and/or a central unit.

13. A method according to any one of embodiments 1 to 12, wherein method further comprises the method steps of:

performing a second measurements of network characteristics of the communications network, and transmitting the second measurements of network characteristics to a network entity and/or a central unit.

14. A method according to any one of embodiments 1 to 13, wherein the method further comprises the method step of:

obtaining at least a second trained encoder of at least a second trained autoencoder, wherein the available autoencoders are differently configured.

15. A method according to embodiment 14, wherein the method step of:

obtaining at least a second trained encoder of at least a second trained autoencoder, wherein the available autoencoders are differently configured, comprises the method step of:

receiving a representation of at least the second trained encoder, wherein at least the second trained encoder is transmitted from a network node or a central unit.

16. A method according to embodiment 15, wherein the method further comprises the method steps of:

receiving a message indicating which of the available autoencoders that should be applied, wherein the message is transmitted from a network entity or a central unit, and updating encoder to be applied to be the encoder of the indicated available autoencoder.

17. A method according to embodiment 14, wherein the method further comprises the method step of:

selecting a trained encoder out of the available encoders, wherein which trained encoder that is selected is based on at least one of:

prevailing radio conditions, type of wireless device performing the method, type of service currently being provided by the wireless device performing the method, current state of charge of a battery of the wireless device performing the method, desired accuracy of reconstructed data, desired autoencoder compression ratio, and/or at least one network condition, wherein the at least one network condition is measurable by the wireless device, updating encoder to be applied, and transmitting towards the network entity a message identifying which of the available encoders that is selected for implementation.

18. A method according to embodiment 17, wherein the at least one network condition is one of: SINR, RSRP, RSRQ, cell load, network congestion, number of active wireless devices fulfilling a predetermined criterion, resource utilization, channel variation and channel quality.

19. A method according to any one of embodiments 1 to 18, wherein the method further comprises the method step of:

obtaining a trained encoder update of a trained autoencoder update, updating the trained encoder currently being applied by implementing the trained encoder update.

20. A method according to embodiment 18, wherein the method step of:

obtaining a trained encoder update of a trained autoencoder update, comprises the method step of:

receiving a representation of a trained encoder update, wherein the representation of a trained encoder update is transmitted from a network node or a central unit.

21. A method according to any one of embodiments 1 to 4, wherein the method step of:

obtaining a trained encoder, of a trained autoencoder, comprises receiving a default trained decoder from a central unit 22. A computer implemented method for reducing data transmissions in a communications network by compression of measurements of network characteristics of the communications network, performed by a network entity, wherein the network entity is operable to transmit and receive signals over the communications network, comprising the method steps of:

obtaining a trained decoder of a trained autoencoder, receiving a compressed representation of a measurements of network characteristics, transmitted by a wireless device, wherein the compressed representation of the measurements of network characteristics has been compressed using a trained encoder of the trained autoencoder, and wherein the compressed representation of the measurements of network characteristics of the communication network comprises compressed measurements of network characteristics performed by a wireless device, and applying the trained decoder to reconstruct the compressed representation of the measurements of network characteristics, whereby reconstructed measurements of network characteristics is generated.

23. A method according to embodiment 22, wherein the method steps of:

receiving a compressed representation of a measurements of network characteristics, transmitted by a wireless device, wherein the compressed representation of the measurements of network characteristics has been compressed using a trained encoder of the trained autoencoder, and wherein the compressed representation of the measurements of network characteristics of the communication network comprises compressed measurements of network characteristics performed by a wireless device, and applying the trained decoder to reconstruct the compressed representation of the measurements of network characteristics, whereby reconstructed measurements of network characteristics is generated, are repeated each time the network entity receives a compressed representation of a measurements of network characteristics.

24. A method according to embodiment 22 or 23, wherein the method further comprises the method step of:

utilizing the reconstructed measurements of network characteristics for performing at least one of: data analytics, initiate a network entity optimization procedure and/or initiate a communications network procedure.

25. A method according to embodiment 24, wherein the communications network procedure being initiated is one of: paging, inter- or intra-frequency handover, random access or re-establishment.

26. A method according to any one of embodiments 22 to 25, wherein the trained decoder of the trained autoencoder has been trained together with an encoder of the same autoencoder, and wherein the encoder and decoder have been trained using training data comprising results of pre-collected measurements of network characteristics, performed by a wireless device.

27. A method according to any one of embodiments 22 to 26, wherein the method step of:

obtaining a trained decoder of a trained autoencoder ( ), comprises the method step of:

training the decoder and an encoder of an autoencoder, by using training data comprising measurements of network characteristics, performed by a wireless device of a communications network, wherein the training data has been provided to the network entity from a wireless device prior to the training.

28. A method according to embodiment 27, wherein the method further comprises the step of:

transmitting a representation of the trained encoder of the trained autoencoder towards a wireless device and/or a central unit.

29. A method according to any one of embodiments 22 to 28, wherein the method step of:

obtaining a trained decoder of a trained autoencoder, comprises the method step of:

receiving a representation of the trained decoder, wherein the trained decoder is transmitted from a wireless device or a central unit.

30. A method according to any one of embodiments 22 to 29, wherein the method step of:

applying the trained decoder to reconstruct the compressed representation of the measurements of network characteristics, whereby reconstructed measurements of network characteristics is generated, comprises the method step of:

using the decoder to restore the compressed representation of the measurements of network characteristics.

31. A method according to any one of embodiments 22 to 30, wherein the method step of:

applying the trained decoder to reconstruct the compressed representation of the measurements of network characteristics, whereby reconstructed measurements of network characteristics is generated, comprises the method step of:

inputting the compressed representation of the measurements of network characteristics to the trained decoder.

32. A method according to any one of embodiments 22 to 31, wherein method further comprises the method step of:

transmitting a request for a second measurements of network characteristics of the communication network, towards the wireless device.

33. A method according to any one of embodiments 22 to 32, wherein method further comprises the method step of:

receiving a second measurements of network characteristics, transmitted by the wireless device, wherein the wireless device has performed the second measurements of network characteristics of the communications network, calculating a trained autoencoder model accuracy.

34. A method according to embodiment 33, wherein the trained autoencoder model accuracy is calculated according to:

number of characteristics correctly reconstructed by the trained decoder, divided by;

the total number of characteristics compressed by the trained encoder.

35. A method according to any one of embodiments 22 to 34, wherein the method further comprises the method step of:

obtaining at least a second trained decoder of at least a second trained autoencoder, wherein the available autoencoders are differently configured.

36. A method according to embodiment 35, wherein the method step of:

obtaining at least a second trained decoder of the at least a second trained autoencoder, wherein the available decoders are differently configured, comprises the method step of:

training at least the second encoder and at least the second decoder of at least the second autoencoder, by using training data comprising measurements of network characteristics performed by a wireless device, wherein the training data has been provided to the network entity from a wireless device prior to the training.

37. A method according to embodiment 35 or 36, wherein the method further comprises the method step of:

selecting a trained autoencoder out of the available autoencoders, for which the decoder is to be applied, wherein which trained autoencoder that is selected is based on at least one of:

a calculated autoencoder model accuracy, application of the reconstructed measurements of network characteristics, desired autoencoder compression ratio, and/or at least one network condition, wherein the at least one network condition is measurable by the network entity, or previously has been transmitted towards the network entity by a wireless device, and updating decoder to be applied to be the decoder of the selected available autoencoder.

38. A method according to embodiment 36 or 37, wherein the method further comprises the method step of:

transmitting towards a wireless device a representation of at least the second trained encoder.

39. A method according to embodiment 38, wherein the method further comprises the method step of:

transmitting towards the wireless device a message identifying which of the available autoencoders that is selected for implementation.

40. A method according to embodiment 37, wherein the at least one network condition is one of: SINR, RSRP, RSRQ, cell load, network congestion, number of active wireless devices fulfilling a predetermined criterion, resource utilization, channel variation and channel quality.

41. A method according to any one of embodiments 33 to 40, wherein the method further comprises the method step of:

comparing the trained autoencoder model accuracy to a model accuracy threshold value.

42. A method according to embodiment 41, wherein if the trained autoencoder model accuracy is equal to and/or lower than the model accuracy threshold value, the method further comprises the method step of:

training an autoencoder update, comprising a trained encoder update and a trained decoder update, by using training data comprising measurements of network characteristics performed by a wireless device.

43. A method according to embodiment 42, wherein the method further comprises the method step of:

transmitting a representation of the trained encoder update towards the wireless device, and updating the trained decoder currently being applied by implementing the trained decoder update.

44. A method according to any one of embodiments 22 to 43, wherein the method step of:

obtaining a trained encoder, of a trained autoencoder, comprises receiving a default trained decoder from a central unit 45. A computer implemented method for training an autoencoder, wherein the autoencoder comprises an encoder and a decoder, and wherein the autoencoder is applied for reducing data transmissions in a communications network, performed by a computer device, wherein the method comprises the method steps of:

obtaining training data comprising measurements of network characteristics, performed by a wireless device, of a communications network, using the obtained training data to train the encoder and decoder of the autoencoder, whereby: the encoder is trained to compress the measurements of network characteristics to generate a compressed representation of measurements of network characteristics, and the decoder is trained to reconstruct the compressed representation of measurements of network characteristics, whereby a trained encoder and trained decoder is obtained.

46. A method according to embodiment 45, wherein the method step of:

obtaining training data comprising measurements of network characteristics performed by a wireless device of a communications network, comprises the method step of:

receiving measurements of network characteristics performed by a wireless device, to be used as training data.

47. A method according to any one of embodiments 45 to 46, wherein using the obtained training data to train the encoder and decoder of the autoencoder, comprises the method steps of:

configuring the autoencoder according to at least one hyperparameter, inputting the obtained training data to the encoder to generate a compressed representation of the training data, inputting the compressed representation of the training data to the decoder to generate reconstructed training data, calculating a loss function expressing the reconstruction error between the training data before being inputted to the encoder and after being reconstructed by the decoder, and minimizing the loss function, expressing the reconstruction error, by optimizing trainable parameters of the autoencoder.

48. A method according to any one of embodiments 45 to 47, wherein the computer device, in which the training is performed in one of: a wireless device, a network entity or a central unit.

49. A wireless device, operable to transmit and receive signals over a communications network, the wireless device comprising processing circuitry configured to enable the wireless device to perform a method comprising the steps of:

obtain a trained encoder, of a trained autoencoder, perform a measurements of network characteristics of the communications network, apply the trained encoder to compress the measurements of network characteristics, whereby a compressed representation of measurements of network characteristics is generated, and transmit the compressed representation of measurements of network characteristics towards a network entity.

50. A wireless device according to embodiment 49, wherein the wireless device is configured to perform any one of the methods of embodiments 2 to 21 or 45 to 48.

51. A network entity, operable to transmit and receive signals over a communications network, the network entity comprising processing circuitry configured to enable the network entity to perform a method comprising the steps of:

obtain a trained decoder of a trained autoencoder, receive a compressed representation of a measurements of network characteristics of the communication network, transmitted by a wireless device, wherein the compressed representation of the measurements of network characteristics has been compressed using a trained encoder of the trained autoencoder, and wherein the compressed representation of the measurements of network characteristics comprises compressed measurements of network characteristics performed by a wireless device, and apply the trained decoder to reconstruct the compressed representation of the measurements of network characteristics, whereby reconstructed measurements of network characteristics is generated.

52. A network entity according to embodiment 51, wherein the network entity is configured to perform any one of the methods of embodiments 22 to 48.

53. A computer program product comprising a computer readable medium carrying a computer program, the computer program comprising computer executable instructions, the computer executable instructions being configured such that, on execution by a computer device, processing circuitry and/or processor, the computer device, processing circuitry and/or processor performs any one of, or a combination of, the methods as defined in any one of embodiments 1 to 48.

54. A wireless device, operable to transmit and receive signals over a communications network, the wireless device comprising:

a processing circuitry, a communication interface coupled to the processing circuitry, and a memory coupled to the processing circuitry, wherein the memory comprises computer executable instructions that, when executed by the processing circuitry, causes the wireless device to perform operations of:

obtaining a trained encoder, of a trained autoencoder, performing a measurements of network characteristics of the communications network, applying the trained encoder to compress the measurements of network characteristics, whereby a compressed representation of measurements of network characteristics is generated, and transmitting the compressed representation of measurements of network characteristics towards a network entity.

55. A wireless device according to embodiment 54, wherein the wireless device is configured to perform any one of the methods of embodiments 2 to 21 or 45 to 48.

56. A network entity, operable to transmit and receive signals over a communications network, the network entity comprising:

a processing circuitry, a communication interface coupled to the processing circuitry, and a memory coupled to the processing circuitry, wherein the memory comprises computer executable instructions that, when executed by the processing circuitry, causes the network entity to perform operations of:

obtaining a trained decoder of a trained autoencoder, receiving a compressed representation of a measurements of network characteristics of the communication network, transmitted by a wireless device, wherein the compressed representation of the measurements of network characteristics has been compressed using a trained encoder of the trained autoencoder, and wherein the compressed representation of the measurements of network characteristics comprises compressed measurements of network characteristics performed by a wireless device, and applying the trained decoder to reconstruct the compressed representation of the measurements of network characteristics, whereby reconstructed measurements of network characteristics is generated.

57. A network entity according to embodiment 56, wherein the network entity is configured to perform any one of the methods of embodiments 22 to 48.

The invention claimed is:

1. A computer implemented method for reducing data transmission in a communications network by compression of measurements of network characteristics of the communications network, performed by a wireless device, wherein the wireless device is operable to transmit and receive signals over the communications network, the method comprising steps of:

obtaining a trained encoder, of a trained autoencoder, performing a measurements of network characteristics, wherein the measurements of network characteristics comprises time-series data of one or more network characteristics of one or more network cells of the communications network, applying the trained encoder to compress the measurements of network characteristics, whereby a compressed representation of the measurements of network characteristics is generated, and transmitting the compressed representation of measurements of network characteristics towards a network entity.

2. The computer implemented method according to claim 1, wherein the method step of:

obtaining a trained encoder of a trained autoencoder, comprises the step of:

training an encoder and a decoder of an autoencoder, by using the training data comprising measurements of network characteristics performed by a wireless device.

3. The computer implemented method according to claim 2, wherein the method further comprises the step of:

transmitting a representation of the trained decoder of the trained autoencoder towards a network entity and/or a central unit.

4. The computer implemented method according to claim 1, wherein the method step of:

obtaining a trained encoder of a trained autoencoder, comprises the step of:

receiving a representation of the trained encoder, wherein the trained encoder is transmitted from a network entity or a central unit.

5. The computer implemented method according to claim 1, wherein the step of:

obtaining a trained encoder of a trained autoencoder, comprises:

obtaining at least one of:

a number of layers of the trained encoder, a number of neurons in respective layer of the trained encoder, activation function of respective neuron of the trained encoder, degree of connectivity between neurons of the trained encoder, type of layer of respective layer, and/or weights for connections between neurons of the trained encoder.

6. The computer implemented method according to claim 1, wherein the method further comprises the step of:

obtaining at least a second trained encoder of at least a second trained autoencoder, wherein the available auto-encoders are differently configured.

7. The computer implemented method according to claim 6, wherein the method further comprises the step of:

selecting a trained encoder out of the available encoders, wherein which trained encoder that is selected is based on at least one of:

prevailing radio conditions, type of wireless device performing the method, type of service currently being provided by the wireless device performing the method, current state of charge of a battery of the wireless device performing the method, desired accuracy of reconstructed data, desired autoencoder compression ratio, and/or at least one network condition, wherein the at least one network condition is measurable by the wireless device, updating encoder to be applied, and transmitting towards the network entity a message identifying which of the available encoders that is selected for implementation.

8. A computer implemented method for reducing data transmissions in a communications network by compression of measurements of network characteristics of the communications network, performed by a network entity, wherein the network entity is operable to transmit and receive signals over the communications network, comprising steps of:

obtaining a trained decoder of a trained autoencoder, training data is collected during a period where the communications network is operating under normal conditions, the conditions reflecting how the communications network is operating predominant part of time, receiving a compressed representation of a measurements of network characteristics, transmitted by a wireless device, wherein the compressed representation of the measurements of network characteristics has been compressed using a trained encoder of the trained autoencoder, and wherein the compressed representation of the measurements of network characteristics of the communication network comprises compressed measurements of network characteristics performed by a wireless device, and applying the trained decoder to reconstruct the compressed representation of the measurements of network characteristics, whereby reconstructed measurements of network characteristics is generated.

9. The computer implemented method according to claim 8, wherein the method further comprises the step of:

utilizing the reconstructed measurements of network characteristics for performing at least one of: data analytics, initiate a network entity optimization procedure and/or initiate a communications network procedure.

10. The computer implemented method according to claim 9, wherein the communications network procedure being initiated is one of: paging, inter- or intra-frequency handover, random access or re-establishment.

11. The computer implemented method according to claim 8, wherein the method step of:

obtaining a trained decoder of a trained autoencoder, comprises the step of:

training the decoder and an encoder of an autoencoder, by using training data comprising measurements of network characteristics, performed by a wireless device of a communications network, wherein the training data has been provided to the network entity from a wireless device prior to the training.

12. The computer implemented method according to claim 11, wherein the method further comprises the step of:

transmitting a representation of the trained encoder of the trained autoencoder towards a wireless device and/or a central unit.

13. The computer implemented method according to claim 8, wherein the step of:

obtaining a trained decoder of a trained autoencoder, comprises the step of:

receiving a representation of the trained decoder, wherein the trained decoder is transmitted from a wireless device or a central unit.

14. The computer implemented method according to claim 8, wherein the method further comprises the step of:

obtaining at least a second trained decoder of at least a second trained autoencoder, wherein the available auto-encoders are differently configured.

15. The computer implemented method according to claim 14, wherein the method further comprises the step of:

selecting a trained autoencoder out of the available auto-encoders, for which the decoder is to be applied, wherein which trained autoencoder that is selected is based on at least one of:

a calculated autoencoder model accuracy, application of the reconstructed measurements of network characteristics, desired autoencoder compression ratio, and/or at least one network condition, wherein the at least one network condition is measurable by the network entity, or previously has been transmitted towards the network entity by a wireless device, and updating decoder to be applied to be the decoder of the selected available autoencoder.

16. The computer implemented method according to claim 15, wherein the method further comprises the step of:

transmitting towards a wireless device a representation of at least the second trained decoder.

17. A wireless device, operable to transmit and receive signals over a communications network, the wireless device comprising processing circuitry configured to enable the wireless device to perform a method comprising the steps of:

obtain a trained encoder, of a trained autoencoder, perform a measurements of network characteristics of the communications network, wherein the measurements of network characteristics comprises time-series data of one or more network characteristics of one or more network cells of the communications network, apply the trained encoder to compress the measurements of network characteristics, whereby a compressed representation of measurements of network characteristics is generated, and transmit the compressed representation of measurements of network characteristics towards a network entity.

18. A network entity, operable to transmit and receive signals over a communications network, the network entity comprising processing circuitry configured to enable the network entity to perform a method comprising the steps of:

obtain a trained decoder of a trained autoencoder, training data is collected during a period where the communications network is operating under normal conditions, the conditions reflecting how the communications network is operating predominant part of time, receive a compressed representation of a measurements of network characteristics of the communication network, transmitted by a wireless device, wherein the compressed representation of the measurements of network characteristics has been compressed using a trained encoder of the trained autoencoder, and wherein the compressed representation of the measurements of network characteristics comprises compressed measurements of network characteristics performed by a wireless device, and apply the trained decoder to reconstruct the compressed representation of the measurements of network characteristics, whereby reconstructed measurements of network characteristics is generated.

\* \* \* \* \*